(12) United States Patent
Nakamura et al.

(10) Patent No.: US 9,077,269 B2
(45) Date of Patent: Jul. 7, 2015

(54) CONTROL SYSTEM FOR AC ELECTRIC MOTOR

(71) Applicants: Makoto Nakamura, Okazaki (JP);
Mikio Yamazaki, Toyota (JP)

(72) Inventors: Makoto Nakamura, Okazaki (JP);
Mikio Yamazaki, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 64 days.

(21) Appl. No.: 14/073,146

(22) Filed: Nov. 6, 2013

(65) Prior Publication Data
US 2014/0125264 A1 May 8, 2014

(30) Foreign Application Priority Data

Nov. 7, 2012 (JP) ................................. 2012-245297

(51) Int. Cl.
*H02P 27/04* (2006.01)
*H02P 6/10* (2006.01)

(52) U.S. Cl.
CPC ........................................ *H02P 6/10* (2013.01)

(58) Field of Classification Search
CPC ........................................................ H02P 6/10
USPC .................. 318/34, 599, 608, 400.01, 400.02,
318/400.14, 400.15, 700, 701, 727, 779,
318/799, 800, 801, 805, 811, 812, 430, 432,
318/434, 437; 363/40, 55, 97, 98, 131, 132
See application file for complete search history.

(56) References Cited

U.S. PATENT DOCUMENTS

| 8,558,500 B2* | 10/2013 | Yamakawa et al. ............ 318/805 |
| 2011/0080131 A1 | 4/2011 | Shimada et al. |
| 2011/0273125 A1* | 11/2011 | Yamada et al. ................. 318/503 |
| 2012/0239237 A1 | 9/2012 | Hashimoto |

FOREIGN PATENT DOCUMENTS

| JP | H3-245793 A | 11/1991 |
| JP | H05-211796 A | 8/1993 |
| JP | 2000-270558 A | 9/2000 |
| JP | 2004-112904 A | 4/2004 |
| JP | 2010-166677 A | 7/2010 |
| JP | 2010-220306 A | 9/2010 |
| JP | 2010-246351 A | 10/2010 |
| JP | 2010-268627 A | 11/2010 |
| JP | 2011-83069 A | 4/2011 |
| WO | 2011/155015 A1 | 12/2011 |

* cited by examiner

*Primary Examiner* — Antony M Paul
(74) *Attorney, Agent, or Firm* — Kenyon & Kenyon LLP

(57) ABSTRACT

Fluctuations in output of an AC electric motor are restrained without increasing electromagnetic noise of a boost converter. When subjecting the AC electric motor to rectangular wave voltage control, output torque T is controlled by varying a voltage phase φv. In a region where a voltage phase is large (φv=θ2), fluctuations in torque T relative to changes in a DC voltage VH corresponding to the amplitude of a rectangular wave voltage are larger than in a region where the voltage phase is small (φv=θ1). The AC electric motor is controlled such that the rectangular wave voltage control in a region where voltage phase φv is larger than a limit-phase line PLN indicated by a set of limit phases set for each DC voltage VH is avoided.

8 Claims, 15 Drawing Sheets

FIG.2

| CONTROL TECHNIQUE | SINE WAVE PWM | OVERMODULATION PWM | RECTANGULAR WAVE (1 PULSE) |
|---|---|---|---|
| VOLTAGE WAVEFORM OUTPUT FROM INVERTER | FUNDAMENTAL WAVE COMPONENT | FUNDAMENTAL WAVE COMPONENT | FUNDAMENTAL WAVE COMPONENT |
| MODULATION DEGREE | 0~0.61(0.7) | 0.61(0.7)~0.78 | 0.78 |
| CHARACTERISTICS | TORQUE LESS FLUCTUATES | OUTPUT IN MID-SPEED RANGE IS IMPROVED | OUTPUT IN HIGH-SPEED RANGE IS IMPROVED |
| SWITCHING LOSS AT IDENTICAL VOLTAGE AND CURRENT | HIGH | INTERMEDIATE | LOW |

# CONTROL SYSTEM FOR AC ELECTRIC MOTOR

This nonprovisional application is based on Japanese Patent Application No. 2012-245297 filed with the Japan Patent Office on Nov. 7, 2012, the entire contents of which are hereby incorporated by reference.

BACKGROUND OF THE INVENTION

1. Field of the Invention

The present invention relates to a control system for an AC electric motor, and more particularly to a control system in which a DC link voltage of an inverter that drives an AC electric motor is variably controlled by a converter.

2. Description of the Background Art

In order to control an AC electric motor through use of a DC power source, a control system by means of an inverter is used. In particular, a structure that variably controls a DC link voltage of an inverter by a boost converter is known, as described in Japanese Patent Laying-Open No. 2004-112904 (PTD 1). As for such a control system, PTD 1 describes control for reducing the influence of dead time of a switching element (transistor) on/off of which is controlled by a boost converter to stably control a DC voltage.

Specifically, PTD 1 describes a technique for reducing the influence of dead time by making the frequency of a carrier (carrier frequency) that controls the on-off duty of the switching element lower than usual when a reactor current of the boost converter, that is, an output current from a battery, is small.

As regarded as a problem in PTD 1 as well, in such a control system that variably controls a DC link voltage of an inverter by a boost converter, fluctuations in DC voltage may lead to torque fluctuations in an AC electric motor. Particularly, in rectangular wave voltage control in which a rectangular wave voltage of a positive pulse and a negative pulse is output from an inverter in order to increase a fundamental wave component of an AC voltage applied to an AC electric motor with respect to an identical DC voltage, the above-described fluctuations in DC voltage are more likely to result in torque fluctuations than in pulse width modulation (PWM) control.

However, as described in PTD 1, if fluctuations in DC voltage are restrained by reducing the carrier frequency of the boost converter, a new problem that electromagnetic noise occurs may arise. In particular, in a control system for an AC electric motor mounted on an electric-powered vehicle, such as a hybrid vehicle, reduction in quietness in the vehicle due to the occurrence of electromagnetic noise is of concern.

SUMMARY OF THE INVENTION

It is an object of the present invention is to restrain output fluctuations in an AC electric motor without increasing electromagnetic noise of a boost converter.

According to an aspect of the present invention, a control system for an AC electric motor includes a boost converter, an inverter, a pulse width modulation control unit, a rectangular-wave voltage control unit, and a phase restriction control unit. The boost converter is configured to execute bidirectional DC electric power conversion between a power storage device and an electric power line such that a DC voltage on the electric power line is controlled in accordance with a voltage command value. The inverter is configured to convert the DC voltage on the electric power line into an AC voltage to be applied to the AC electric motor. The pulse width modulation control unit is configured to control the AC voltage output from the inverter to the AC electric motor by pulse width modulation control based on a comparison between a sinusoidal voltage command signal for operating the AC electric motor in accordance with a torque command value and a carrier signal. The rectangular-wave voltage control unit is configured to control the AC voltage output from the inverter to the AC electric motor such that a rectangular wave voltage is applied from the inverter to the AC electric motor when a modulation degree of the AC voltage by the pulse width modulation control on the DC voltage exceeds a predetermined reference value. The rectangular-wave voltage control unit controls the inverter in accordance with the torque command value such that an absolute value of a voltage phase of the rectangular wave voltage is increased when the absolute value of torque of the AC electric motor is increased. The phase restriction control unit operates the AC electric motor such that rectangular wave voltage control is avoided from being performed in a state where the absolute value of the voltage phase falls within a region exceeding a limit phase set in accordance with the DC voltage and a rotational speed of the AC electric motor.

Preferably, during the pulse width modulation control, the phase restriction control unit is configured to increase the voltage command value in accordance with an operating state of the AC electric motor such that the modulation degree does not exceed the reference value.

More preferably, when an operating point indicated by the rotational speed and torque of the AC electric motor falls within a predetermined region set for each DC voltage during the pulse width modulation control, the phase restriction control unit is configured to increase the voltage command value such that the modulation degree falls below the reference value. The predetermined region is set previously in correspondence to a region in which the absolute value of the voltage phase exceeds the limit phase when the rectangular wave voltage control is executed at the DC voltage and the operating point.

Still more preferably, when the absolute value of a voltage phase indicated by a d-axis voltage and a q-axis voltage exceeds the limit phase during the pulse width modulation control, the phase restriction control unit increases the voltage command value such that the modulation degree falls below the reference value.

Preferably, when the absolute value of the voltage phase during the rectangular wave voltage control exceeds the limit phase, the phase restriction control unit increases the voltage command value such that the absolute value of the voltage phase falls below the limit phase.

Preferably, the control system is configured such that a plurality of AC electric motors mounted on an electric-powered vehicle are electrically connected in common to the electric power line via a plurality of inverters, respectively. The plurality of AC electric motors include a first electric motor as an electric motor for driving the electric-powered vehicle. The control system further includes a torque command value setting unit and a torque command value correction unit. The torque command value setting unit sets a torque command value for each of the plurality of AC electric motors in accordance with an operating state of the electric-powered vehicle. The phase restriction control unit decreases the torque command value for the first electric motor when the absolute value of the voltage phase obtained by the rectangular wave voltage control at the DC voltage at present exceeds the limit phase. When the torque command value for the first electric motor is decreased by the phase restriction control unit, the torque command value correction unit corrects the torque command value for electric motors other than the first electric motor so as to compensate for a reduction in vehicle driving force caused by the decrease.

Preferably, only when the absolute value of an input/output current of the power storage device is smaller than a reference value, the phase restriction control unit executes control for avoiding the rectangular wave voltage control from being performed in a state where the absolute value of the voltage phase exceeds a limit phase set for each DC voltage.

Alternatively, preferably, the limit phase is determined based on a magnitude of a torque fluctuation relative to a fluctuation in the DC voltage in each voltage phase at each DC voltage and each rotational speed.

In this control system for an AC motor, output fluctuations in an AC electric motor can be restrained without increasing electromagnetic noise of a boost converter.

The foregoing and other objects, features, aspects and advantages of the present invention will become more apparent from the following detailed description of the present invention.

BRIEF DESCRIPTION OF THE DRAWINGS

FIG. 2 is a diagram illustrating an inverter control techniques for AC electric motor control.

DESCRIPTION OF THE PREFERRED EMBODIMENTS

Figure 1:
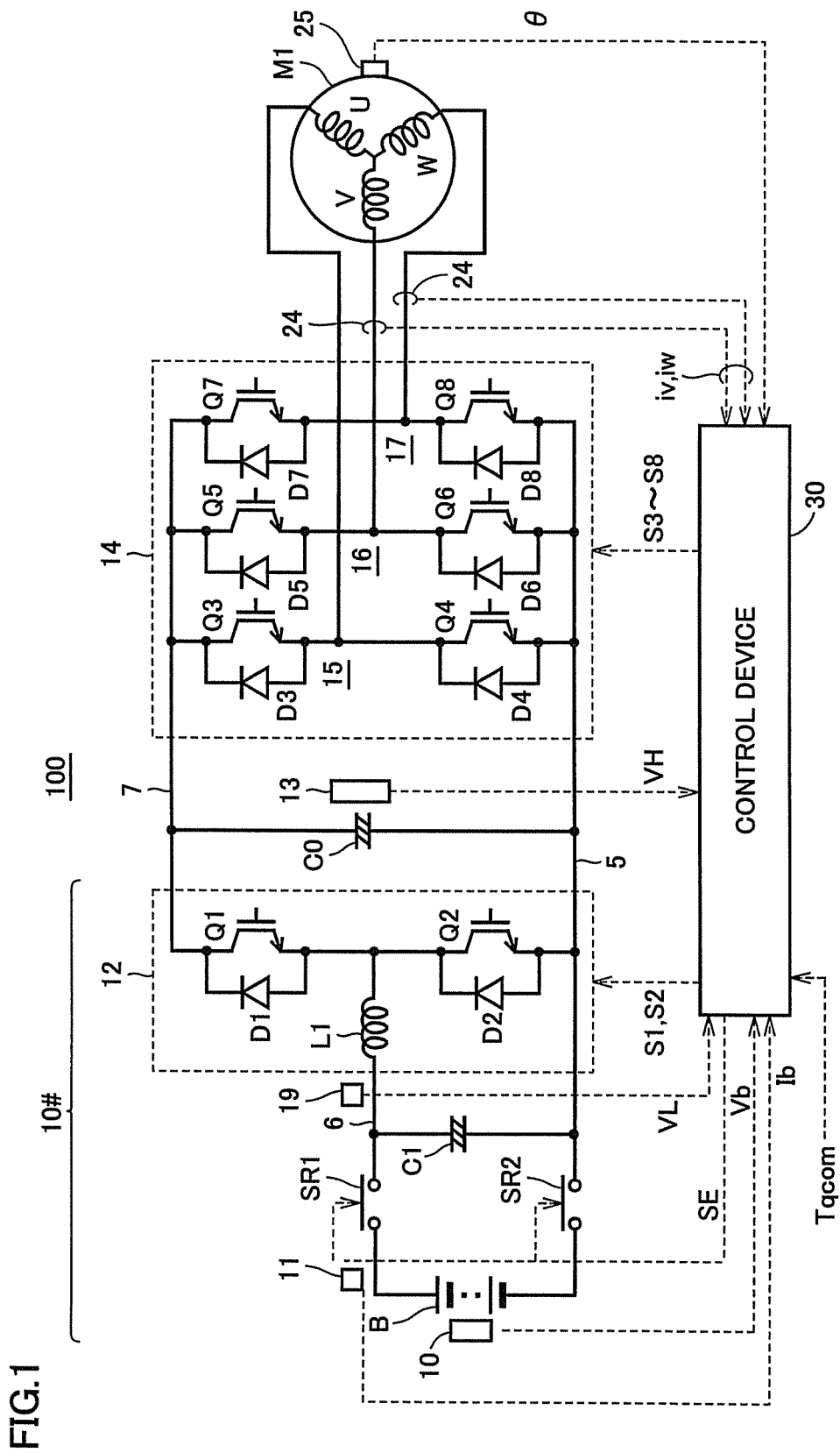
FIG. 1 is an overall configuration diagram of a control system for an AC electric motor according to a first embodiment of the present invention.

Hereinafter, embodiments of the present invention will be described in detail with reference to the drawings. It is noted that, in the drawings, the same or corresponding portions have the same reference characters allotted, and detailed description thereof will not be repeated in principle.

[First Embodiment]

(System Configuration)

FIG. 1 is an overall configuration diagram of a control system for an AC electric motor according to a first embodiment of the present invention.

Referring to FIG. 1, a control system 100 includes a DC voltage generation unit 10#, a smoothing capacitor C0, an inverter 14, an AC electric motor M1, and a control device 30.

AC electric motor M1 is, for example, a traction motor configured to cause a driving wheel of an electric-powered vehicle (which shall comprehensively represent vehicles capable of producing vehicle driving force by means of electrical energy, such as a hybrid vehicle, an electric vehicle, and a fuel-cell vehicle) to produce torque. Alternatively, this AC electric motor M1 may be configured to have a function of an electric power generator driven by the engine, or may be configured to have functions of both an electric motor and an electric power generator. Furthermore, AC electric motor M1 may be incorporated into a hybrid vehicle so as to operate as an electric motor for the engine, and for example, so as to be capable of starting the engine. That is, in the present embodiment, "an AC electric motor" includes an electric motor, an electric power generator and an electric motor generator (motor generator) driven by an alternating current.

DC voltage generation unit 10# includes a DC power source B, system relays SR1, SR2, a smoothing capacitor C1, and a boost converter 12.

DC power source B is representatively implemented by a rechargeable power storage device, such as a nickel-metal hydride, lithium ion or similar secondary battery, or an electric double layer capacitor. A DC voltage VL output from DC power source B and a direct current Ib output/input from/to DC power source B are detected by a voltage sensor 10 and a current sensor 11, respectively.

System relay SR1 is connected across a positive electrode terminal of DC power source B and an electric power line 6, and system relay SR2 is connected across a negative electrode terminal of DC power source B and an electric power line 5. System relays SR1, SR2 are turned on/off by a signal SE from control device 30.

Boost converter 12 includes a reactor L1 and power semiconductor switching elements Q1, Q2. Power semiconductor switching elements Q1 and Q2 are connected in series across electric power lines 7 and 5. On/off of power semiconductor switching elements Q1 and Q2 is controlled by switching control signals S1 and S2 from control device 30.

In embodiments of the present invention, a power semiconductor switching element (hereinafter, simply called "a switching element") can be implemented by an IGBT (Insulated Gate Bipolar Transistor), a power MOS (Metal Oxide Semiconductor) transistor, a power bipolar transistor, or the like. Antiparallel diodes D1, D2 are provided for switching elements Q1, Q2, respectively. Reactor L1 is connected across the connection node of switching elements Q1, Q2 and electric power line 6. Smoothing capacitor C0 is connected across electric power lines 7 and 5.

Smoothing capacitor C0 smoothes a DC voltage of electric power line 7. A voltage sensor 13 detects a voltage across smoothing capacitor C0, that is, a DC voltage VH on electric power line 7. Hereinafter, DC voltage VH equivalent to a DC link voltage of inverter 14 will also be called "system voltage VH." On the other hand, a DC voltage VL on electric power line 6 is detected by a voltage sensor 19. DC voltages VH and VL detected by voltage sensors 13 and 19 are input to control device 30.

Inverter 14 is composed of U-phase upper and lower arms 15, V-phase upper and lower arms 16, and W-phase upper and lower arms 17 provided in parallel across electric power lines 7 and 5. The upper and lower arms of each phase are implemented by switching elements connected in series across electric power lines 7 and 5. For example, U-phase upper and lower arms 15 are implemented by switching elements Q3, Q4, V-phase upper and lower arms 16 are implemented by switching element Q5, Q6, and W-phase upper and lower arms 17 are implemented by switching elements Q7, Q8. Antiparallel diodes D3 to D8 are connected to switching elements Q3 to Q8, respectively. On/off of switching elements Q3 to Q8 is controlled by switching control signals S3 to S8 from control device 30.

Representatively, AC electric motor M1 is a three-phase permanent-magnet type synchronous motor, and one ends of three coils of U, V and W-phases are connected in common to a neutral point. Furthermore, the other end of each phase coil is connected to the intermediate point of the switching elements of each phase upper and lower arms 15 to 17.

Boost converter 12 is basically controlled such that switching elements Q1 and Q2 are turned on/off complementarily and alternately in each switching cycle equivalent to one cycle of a carrier (not shown) used for PWM control. Boost converter 12 can control a boosting ratio (VH/VL) by controlling the on period ratio (duty ratio) between switching elements Q1 and Q2. Therefore, on/off of switching elements Q1, Q2 is controlled in accordance with the duty ratio calculated in accordance with detection values of DC voltages VL, VH and a voltage command value VH#.

When the frequency of a carrier wave (carrier frequency) is increased, the switching loss in boost converter 12 is increased. On the other hand, when the carrier frequency is decreased, electromagnetic noise perceived by a user becomes larger because switching is conducted in the audio frequency band. Therefore, as for the carrier frequency, it is common that a predetermined frequency by which the switching loss will not be excessively large within a frequency range that can restrain electromagnetic noise is previously determined as a default value.

By turning switching element Q1 on/off complementarily to switching element Q2, both charging and discharging of DC power source B can be handled without switching control depending on the current direction in reactor L1. That is, boost converter 12 can handle both regeneration and power running through control of system voltage VH in accordance with voltage command value VH#.

It is noted that, when the output of AC electric motor M1 is low, AC electric motor M1 can be controlled in the state of VH=VL (boosting ratio=1.0) without boosting by boost converter 12. In this case (hereinafter also called "a non-boosting mode"), switching elements Q1 and Q2 are fixed at on and off, respectively, so that the power loss in boost converter 12 is reduced.

In the case where a torque command value for AC electric motor M1 is higher than zero (Tqcom>0), upon receipt of a DC voltage from smoothing capacitor C0, inverter 14 converts the DC voltage into an AC voltage by the switching operation of switching elements Q3 to Q8 in response to switching control signals S3 to S8 from control device 30, thereby driving AC electric motor M1 to output positive torque. In the case where the torque command value for AC electric motor M1 is zero (Tqcom=0), inverter 14 converts a DC voltage into an AC voltage by the switching operation of switching control signals S3 to S8, thereby driving AC electric motor M1 such that torque is zero. Accordingly, AC electric motor M1 is driven to produce zero or positive torque indicated by torque command value Tqcom.

Furthermore, at the time of regenerative braking of the electric-powered vehicle on which control system 100 is mounted, torque command value Tqcom for AC electric motor M1 is set to be smaller than zero (Tqcom<0). In this case, inverter 14 converts an AC voltage generated by AC electric motor M1 into a DC voltage by the switching operation in response to switching control signals S3 to S8, and supplies the DC voltage (system voltage VH) obtained by conversion to boost converter 12 via smoothing capacitor C0.

It is noted that regenerative braking as used herein includes braking accompanied by regenerative power generation when a driver driving the electric-powered vehicle operates a foot brake, and decelerating the vehicle (or stop of acceleration) while bringing about regenerative power generation by turning off the accelerator pedal during running even though the foot brake is not operated.

A current sensor 24 detects a current (phase current) flowing in AC electric motor M1, and outputs the detection value to control device 30. It is noted that, since the sum of instantaneous values of three-phase currents iu, iv and iw is zero, current sensor 24 may be arranged so as to detect motor currents of two phases (e.g., V-phase current iv and W-phase current iw) as shown in FIG. 1.

A rotational angle sensor (resolver) 25 detects rotor rotational angle θ of AC electric motor M1, and sends detected rotational angle θ to control device 30. Control device 30 is capable of calculating a rotational speed Nmt and a rotational angle speed ω of AC electric motor M1 based on rotational angle θ. It is noted that rotational angle sensor 25 may be omitted by directly calculating rotational angle θ from motor voltages or currents by control device 30.

Control device 30 is implemented by an electronic control unit (ECU) and controls the operation of control system 100 by software processing achieved by execution of a previously stored program by a CPU (Central Processing Unit) not shown and/or hardware processing achieved by a dedicated electronic circuit.

As its typical function, control device 30 controls the operations of boost converter 12 and inverter 14 based on received torque command value Tqcom, DC voltage VL detected by voltage sensor 19, direct current Ib detected by current sensor 11, system voltage VH detected by voltage sensor 13, motor currents iu (iu=−(iv+iw)), iv and iw detected by current sensor 24, rotational angle θ received from rotational angle sensor 25, and the like such that AC electric motor M1 outputs torque in accordance with torque command value Tqcom by a control system which will be described later.

That is, control device 30 generates switching control signals S1, S2 for boost converter 12 in order to control DC voltage VH in accordance with voltage command value VH# as described above. Control device 30 also generates switching control signals S3 to S8 for controlling output torque of AC electric motor M1 in accordance with torque command value Tqcom. Switching control signals S1 to S8 are input to boost converter 12 and inverter 14.

(Control Mode in Electric Motor Control)

FIG. 2 is a diagram illustrating an inverter control techniques for AC electric motor control.

As shown in FIG. 2, in the control system for an AC electric motor according to an embodiment of the present invention, three control systems for AC electric motor control by inverter 14 are switched and used.

Sine wave PWM control is used as common PWM control, and controls on/off of the switching elements in each-phase arms in accordance with a voltage comparison between a sinusoidal voltage command value and a carrier (representatively, a triangular wave). As a result, for the set of high level periods corresponding to the on periods of the upper arm elements and the low level periods corresponding to the on periods of the lower arm elements, the duty ratio is controlled such that its fundamental wave component is a sine wave within a certain period.

Hereinafter, in the present specification, the ratio of an AC voltage (an effective value of a line voltage) output to AC electric motor M1 to a DC link voltage (system voltage VH) in DC-AC voltage conversion by the inverter is defined as "a modulation degree." The application of the sine wave PWM control is basically limited to the state in which an AC voltage amplitude (phase voltage) of each phase becomes equal to system voltage VH. That is, the sine wave PWM control can only increase the modulation degree by about 0.7.

On the other hand, in the rectangular wave voltage control, the inverter outputs 1 pulse of a rectangular wave whose ratio between the high level periods and the low level periods is 1:1, within a period equivalent to 360 electrical angles of the electric motor. Accordingly, the modulation degree is increased to 0.78.

In overmodulation PWM control, the amplitude of a (sinusoidal) AC voltage which is larger than the amplitude of a carrier is extended, and then PWM control similar to the above-described sine wave PWM control is conducted. As a result, a fundamental wave component is distorted, so that the modulation degree can be increased to the range of 0.7 to 0.78. Accordingly, PWM control can also be applied to a portion of a region where the AC voltage amplitude (phase voltage) of each phase is higher than system voltage VH.

In the case of supplying an identical motor current at identical system voltage VH, that is, at an identical DC voltage switched by the inverter, the switching loss in the inverter depends on the number of times of switching within unit time. Therefore, under such an identical condition, the switching loss is increased in the sine wave PWM control, while the switching loss is decreased in the rectangular wave voltage control.

On the other hand, in order to drive AC electric motor M1 smoothly, it is necessary to set system voltage VH appropriately in accordance with operating points (rotational speed and torque) of AC electric motor M1. At this time, as described above, the modulation degree that can be achieved has a limit in each control mode. Therefore, there is an increasing need for raising system voltage VH as the output of AC electric motor M1 indicated by the product of the rotational speed and torque increases.

(Description of Control Configuration in Each Control Mode)

Figure 3:
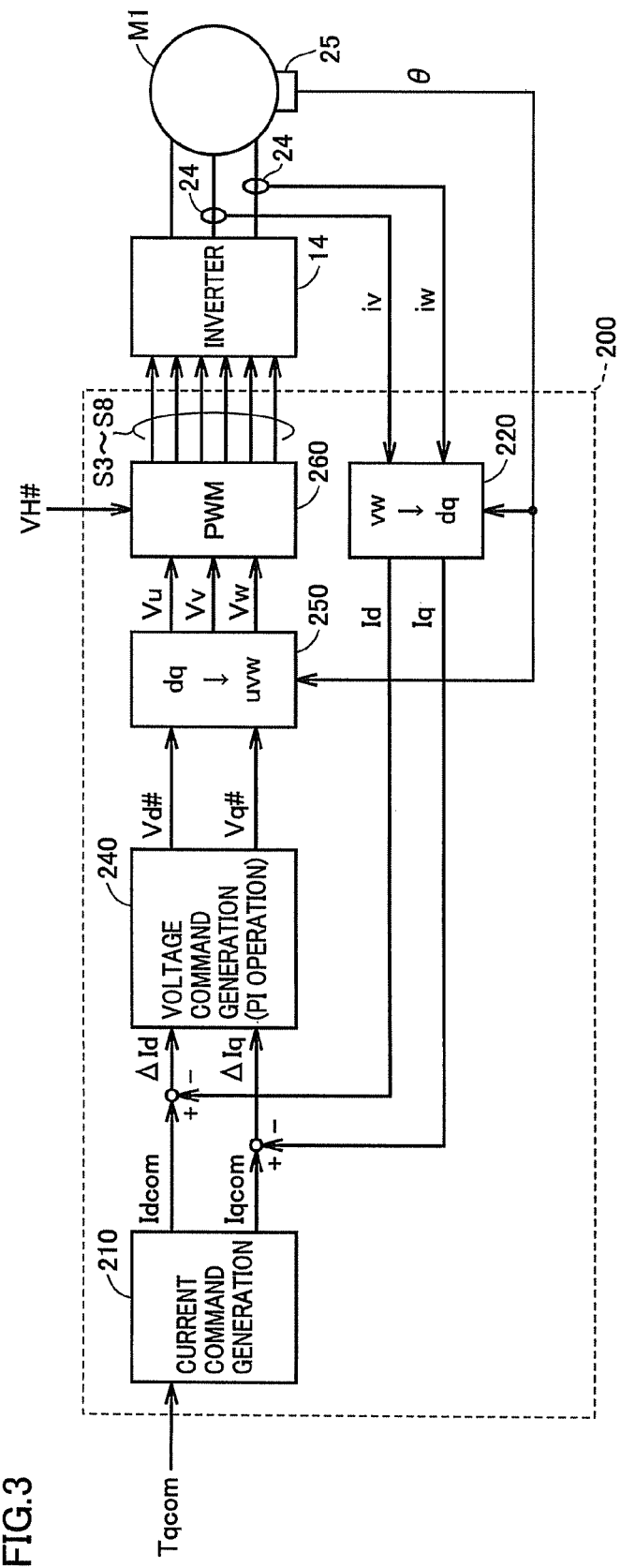
FIG. 3 is a functional block diagram illustrating a control configuration in PWM control in a control system for an AC electric motor according to an embodiment of the present invention.

FIG. 3 is a functional block diagram illustrating a control configuration in PWM control in a control system for an AC electric motor according to an embodiment of the present invention. The respective functional blocks for motor control shown in the functional block diagrams which will be described below including FIG. 3 are achieved by hardware- or software-based processing by control device 30.

Referring to FIG. 3, a PWM control unit 200 includes a current command generation unit 210, coordinate conversion units 220, 250, a voltage command generation unit 240, and a PWM modulation unit 260.

Current command generation unit 210 generates a d-axis current command value Idcom and a q-axis current command value Iqcom corresponding to torque command value Tqcom for AC electric motor M1 in accordance with a map created previously or the like. As will be described later, the current phase of AC electric motor M1 can be controlled properly by the combination of d-axis current command value Idcom and q-axis current command value Iqcom.

Coordinate conversion unit 220 calculates a d-axis current Id and a q-axis current Iq based on V-phase current iv and W-phase current iw detected by current sensor 24, by means of coordinate conversion (three phases to two phases) through use of rotational angle θ of AC electric motor M1 detected by rotational angle sensor 25.

Voltage command generation unit 240 receives a deviation ΔId from a command value for the d-axis current (ΔId=Idcom−Id) and a deviation ΔIq from a command value for the q-axis current (ΔIq=Iqcom−Iq). Voltage command generation unit 240 performs a PI (proportional integral) operation with a predetermined gain for each of d-axis current deviation ΔId and q-axis current deviation ΔIq to obtain an error deviation, and generates a d-axis voltage command value Vd# and a q-axis voltage command value Vq# depending on this error deviation.

Coordinate conversion unit 250 converts d-axis voltage command value Vd# and q-axis voltage command value Vq# into each-phase voltage commands Vu, Vv and Vw of the U-, V- and W-phases by coordinate conversion (two phases to three phases) through use of rotational angle θ of AC electric motor M1.

At this time, a modulation degree Kmd is expressed by Expression (2) indicated below using d-axis voltage command value Vd#, q-axis voltage command value Vq# and system voltage VH.

$$Kmd = (Vd\#^2 + Vq\#^2)^{1/2}/VH \qquad (1)$$

PWM modulation unit 260 controls on/off of the upper and lower arm elements of the respective phases of inverter 14 based on the comparison between a carrier not shown and an AC voltage command (comprehensively representing Vu, Vv and Vw), thereby generating a pseudo sine-wave voltage for each phase of AC electric motor M1. The carrier is composed of a triangular wave or a sawtooth wave of a predetermined frequency. It is noted that 3n-order higher harmonic can be superimposed on a sine-wave AC voltage command.

It is noted that, in the pulse width modulation in inverter 14, the amplitude of a carrier is equivalent to the DC link voltage (system voltage VH) of inverter 14. It is noted that, if the amplitude of the AC voltage command to be subjected to PWM modulation is converted into an amplitude obtained by dividing the amplitude of original voltage commands Vu, Vv and Vw of the respective phases by system voltage VH, the amplitude of the carrier used in PWM modulation unit 260 can be fixed.

It is noted that, when modulation degree Kmd increases to the range of 0.61 to 0.78 when the sine wave PWM is selected, overmodulation PWM is applied. In the overmodulation PWM control, the amplitude of each-phase voltage commands obtained by converting voltage command values Vd# and Vq# from two to three phases becomes larger than the DC link voltage (system voltage VH) of inverter 14. On the other hand, since a voltage exceeding system voltage VH cannot be applied from inverter 14 to AC electric motor M1, the original modulation degree corresponding to voltage command values Vd#, Vq# cannot be ensured by the PWM control in accordance with each-phase voltage command signals.

Therefore, in the overmodulation PWM control, the AC voltage commands obtained by voltage command values Vd#, Vq# are subjected to correction processing of extending the voltage amplitude ($\times k$, $k>1$) such that the voltage applied section increases. The original modulation degree in accordance with voltage command values Vd#, Vq# can thereby be ensured. Such amplitude correction processing can be executed by adding a function in voltage command generation unit 240 or coordinate conversion unit 250 during the overmodulation PWM control.

When the sine wave PWM control or the overmodulation PWM control is applied, switching of inverter 14 is controlled in accordance with switching control signals S3 to S8 generated by PWM control unit 200. Accordingly, an AC voltage for output of torque in accordance with torque command value Tqcom is applied to AC electric motor M1. That is, torque control for AC electric motor M1 can be conducted by feedback control of motor current with current command values Idcom and Iqcom that define the current phase serving as reference values.

Figure 4:
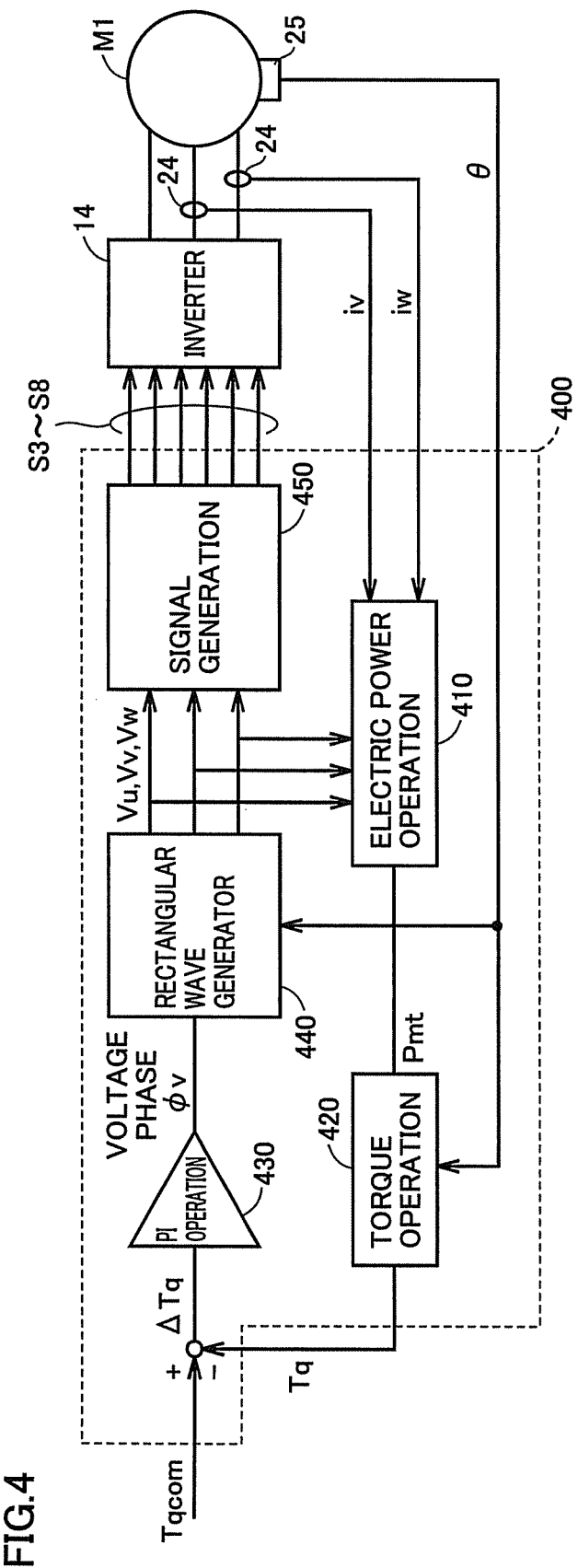
FIG. 4 is a functional block diagram illustrating a control configuration in rectangular wave voltage control in a control system for an AC electric motor according to an embodiment of the present invention.

FIG. 4 is a functional block diagram illustrating a control configuration in rectangular wave voltage control in a control system for an AC electric motor according to an embodiment of the present invention.

Referring to FIG. 4, a rectangular-wave voltage control unit 400 includes an electric power operation unit 410, a torque operation unit 420, a PI operation unit 430, a rectangular wave generator 440, and a signal generation unit 450.

Electric power operation unit 410 calculates supply electric power Pmt (motor electric power) for the motor in accordance with Expression (2) indicated below by each-phase currents obtained from V-phase current iv and W-phase current iw by current sensor 24, as well as each-phase voltages Vu, Vv and Vw.

$$Pmt = iu \cdot Vu + iv \cdot Vv + iw \cdot Vw \qquad (2)$$

Torque operation unit 420 calculates a torque estimated value Tq in accordance with Expression (3) indicated below using motor electric power Pmt obtained by electric power operation unit 410 and rotational angle speed ω calculated from rotational angle θ of AC electric motor M1 detected by rotational angle sensor 25.

$$Tq = Pmt/\omega \qquad (3)$$

It is noted that, by providing a torque sensor instead of electric power operation unit 410 and torque operation unit 420, torque deviation ΔTq may be obtained based on a detection value of the torque sensor.

Torque deviation ΔTq from torque command value Tqcom (ΔTq=Tqcom−Tq) is input to PI operation unit 430. PI operation unit 430 subjects torque deviation ΔTq to a PI operation with a predetermined gain to obtain an error deviation, and sets a phase φv of a rectangular wave voltage in accordance with the obtained error deviation.

Figure 5:
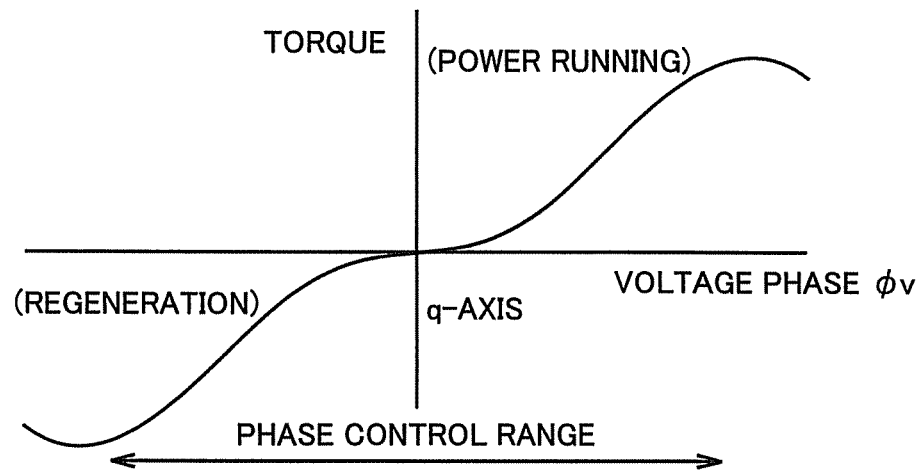
FIG. 5 is a first conceptual diagram illustrating the voltage phase-torque characteristic in rectangular wave voltage control.

Referring to FIG. 5, during the rectangular wave voltage control, output torque of AC electric motor M1 is controlled by varying voltage phase φv of a rectangular wave voltage. Power running torque can be increased by advancing voltage phase φv with respect to the q-axis. On the other hand, during a regenerative operation (while negative torque is output), regeneration torque can be increased by delaying voltage phase φv with respect to the q-axis.

Hereinafter, the phase difference of voltage phase φv with respect to the q-axis will also be called "the magnitude (absolute value) of a voltage phase." That is, it will be understood that, in the rectangular wave voltage control, when the voltage phase is increased through power running and regeneration, output torque (absolute value) of AC electric motor M1 is increased.

Referring again to FIG. 4, rectangular wave generator 440 produces each-phase voltage commands (rectangular wave pulses) Vu, Vv and Vw in accordance with voltage phase φv set by PI operation unit 430. Signal generation unit 450 produces switching control signals S3 to S8 in accordance with each-phase voltage commands Vu, Vv and Vw. When inverter 14 makes a switching operation in accordance with switching control signals S3 to S8, a rectangular wave voltage pulse in accordance with voltage phase φv is applied as an each-phase voltage of the motor.

In this manner, during the rectangular wave voltage control, torque control of AC electric motor M1 can be conducted by the torque (electric power) feedback control. However, in the rectangular wave voltage control, the amplitude of the voltage applied to AC electric motor M1 is fixed, and only the voltage phase can be controlled. Therefore, control responsiveness is lower than in the PWM control in which both the amplitude and the phase of the applied voltage can be controlled.

Figure 6:
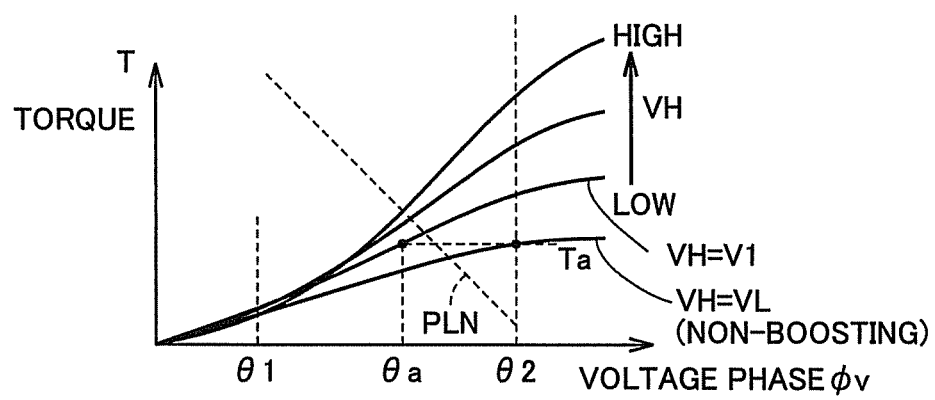
FIG. 6 is a second conceptual diagram illustrating the voltage phase-torque characteristic in rectangular wave voltage control.

Referring to FIG. 6, torque control in the rectangular wave voltage control will be described further in detail. As shown in FIG. 6 as well, the present embodiment will hereinafter describe control during a power running operation (while positive torque is output). However, it is noted for confirmation that, if the polarity of voltage phase φv with respect to the q-axis is reversed, AC electric motor control similar to that of the present embodiment can also be executed during a regenerative operation (while negative torque is output).

Output torque T of AC electric motor M1 in the rectangular wave voltage control is varied in accordance with Expression (4) indicated below based on the operating state of AC electric motor M1.

$$T = \frac{1}{2} \frac{p(L_d - L_q)}{\omega^2 L_d L_q} V^2 \sin 2\theta + \frac{p\phi k V}{\omega L_d} \sin\theta \quad (4)$$

It is noted that, in Expression (4), p represents the number of pole pairs, Ld and Lq represent inductor components of the d-axis and the q-axis, θ represents the voltage phase (θ=φv), and φk represents the induced voltage constant. These are motor constants. V represents the motor applied voltage (V=VH), and ω represents the rotation angular velocity.

FIG. 6 shows the voltage phase-torque characteristic in each case of varying system voltage VH at a constant rotational speed (ω is constant).

As understood from FIG. 6, output torque is increased as system voltage VH becomes higher with respect to identical voltage phase φv. Therefore, when high torque is requested, output torque for an identical voltage phase control range can be ensured by raising system voltage VH by boost converter 12.

On the other hand, as described above, boost converter 12 is increased in efficiency in the non-boosting mode (VH=VL) because the switching loss is reduced. In contrast, when boost converter 12 is caused to perform a boosting operation (VH>VL), boost converter 12 is relatively reduced in efficiency due to the switching losses in switching elements Q1 and Q2.

In the control system for an AC electric motor according to the present embodiment, the above-described sine wave PWM control, overmodulation PWM control and rectangular wave voltage control are selectively applied in accordance with the state of AC electric motor M1.

Figure 7:
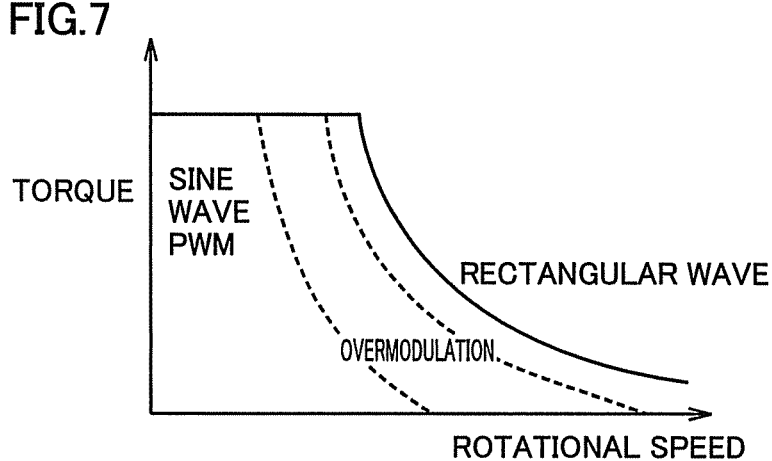
FIG. 7 is a conceptual diagram schematically showing the relationship between operating points of the AC electric motor and control mode selection.

Schematically, as shown in FIG. 7, the control mode is switched in accordance with the operating point (the combination of torque and rotational speed) of AC electric motor M1.

Referring to FIG. 7, in general, the sine wave PWM control is applied to a low-speed rotation range and a mid-speed rotation range, and the overmodulation control is applied to the mid-speed rotation range and a high-speed rotation range. In a higher speed rotation range, the rectangular wave voltage is applied to control AC electric motor M1. However, a selection between the PWM control (sine wave PWM or overmodulation PWM) and the rectangular wave voltage control is made in accordance with the modulation degree. On the other hand, it is understood that even at an identical motor applied voltage, the modulation degree is changed when system voltage VH is changed, so that the control mode to be applied varies.

Figure 8:
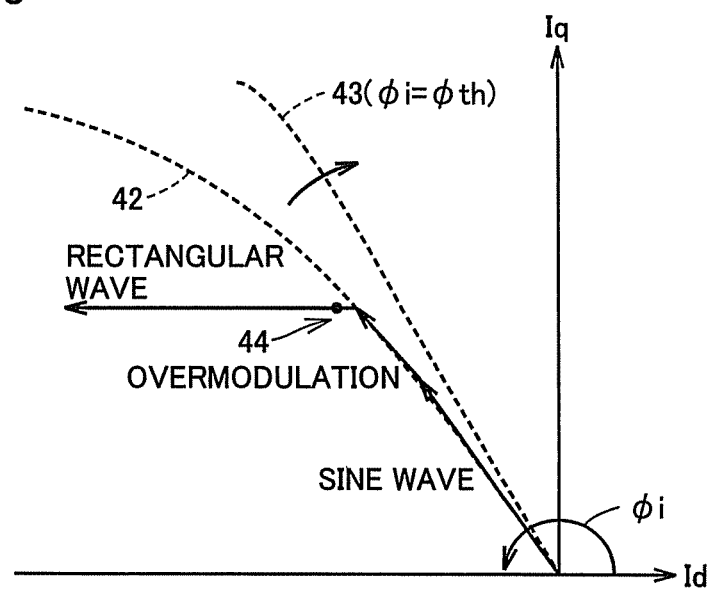
FIG. 8 is a graph showing the current phase of the AC electric motor in each control mode.

FIG. 8 is a graph showing the current phase of AC electric motor M1 in each control mode.

The locus of changes in current phase when output torque is gradually increased with respect to identical DC voltage VH is illustrated in FIG. 8. The horizontal axis of FIG. 8 indicates d-axis current Id, and the vertical axis of FIG. 8 indicates q-axis current Iq. Current phase φi is defined by Expression (5) indicated below.

$$\tan^{-1}\phi i = \frac{I_q}{I_d} \quad (5)$$

In the sine wave PWM control and the overmodulation PWM control, current phase φi is determined to lie on an optimal current lead angle line 42. Optimal current lead angle line 42 is drawn as a set of current phase points at which the loss in AC electric motor M1 on an equal torque line on the Id-Iq plane is minimized. That is, current command generation unit 210 (FIG. 3) is configured to generate current command values Idcom and Iqcom of the d- and q-axes corresponding to the intersection of an equal torque line corresponding to torque command value Tqcom and optimal current lead angle line 42. The optimal current lead angle line can be obtained previously by experiments or simulations. Therefore, a map that determines the combination of current command values Idcom and Iqcom on optimal current lead angle line 42 in correspondence to each torque command value can be created previously and stored in control device 30.

In FIG. 8, the locus in which the leading position (current phase) of the current vector determined by the combination of Id and Iq starting from the zero position changes in accordance with increase in output torque is indicated by arrows. The magnitude of current (equivalent to the magnitude of the current vector on the Id-Iq plane) is increased as output torque is increased. In the sine wave PWM control and the overmodulation PWM control, the current phase is controlled to lie on optimal current lead angle line 42 by setting current command values Idcom and Iqcom. When the torque command value is further increased and the modulation degree reaches 0.78, the rectangular wave voltage control is applied.

Because field weakening control is performed in the rectangular wave voltage control, the absolute value of d-axis current Id which is a field current is increased as output torque is increased by increasing voltage phase φv. As a result, the leading position (current phase) of the current vector goes away from optimal current lead angle line 42 toward the left-hand side in the drawing (the angle-of-lead side), which increases the loss in AC electric motor M1. In this manner, in the rectangular wave voltage control, the current phase of AC electric motor M1 cannot be directly controlled by inverter 14.

In contrast, when output torque is decreased by decreasing voltage phase φv at identical system voltage VH, current phase φi is changed toward the right-hand side in the drawing (to the angle-of-delay side). Then, when current phase φi reaches the angle-of-delay side with respect to a mode switching line 43 during the rectangular wave voltage control, a transition from the rectangular wave voltage control to the PWM control from is instructed. For example, mode switching line 43 is drawn as a set of current phase points at which φi=φth (reference value) holds. In other words, when current phase φi falls below φth (reference value), the transition from the rectangular wave voltage control to the PWM control is instructed.

Figure 9:
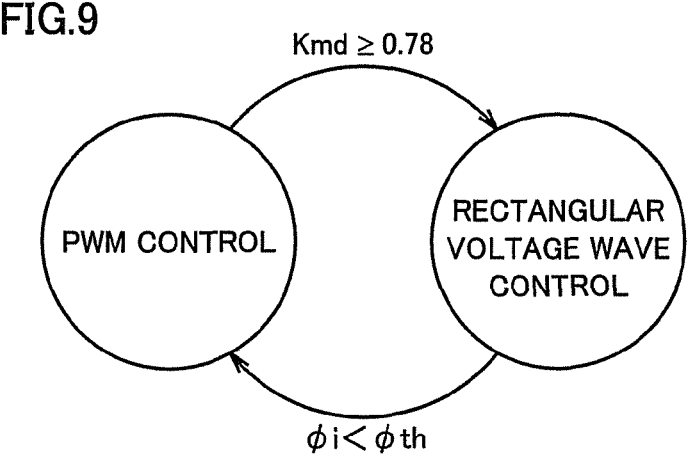
FIG. 9 is a transition diagram for illustrating mode switching between PWM control and rectangular wave voltage control.

FIG. 9 is a transition diagram for illustrating mode switching between the PWM control and the rectangular wave voltage control.

Referring to FIG. 9, when the sine wave PWM or the overmodulation PWM control is applied, modulation degree Kmd can be calculated in accordance with Expression (1) indicated below based on voltage command values Vd# and Vq# calculated by PWM control unit 200 shown in FIG. 3. When modulation degree Kmd becomes larger than 0.78, a transition to the rectangular wave voltage control mode is instructed.

In the rectangular wave control mode, current phase φi is changed toward the right-hand side of FIG. 8 (the angle-of-lead side) along with a decrease in output torque. When current phase φi falls below reference value φth, that is, when it enters a phase region on the angle-of-delay side with respect to mode switching line 43 shown in FIG. 8, the transition to PWM control mode is instructed.

When varying system voltage VH relative to an identical output of AC electric motor M1, the modulation degree in the PWM control is changed. In the rectangular wave voltage control, current phase φi is changed along with changes in voltage phase φv for obtaining that output. Therefore, the loss in the control system is changed in accordance with system voltage VH.

Figure 10:
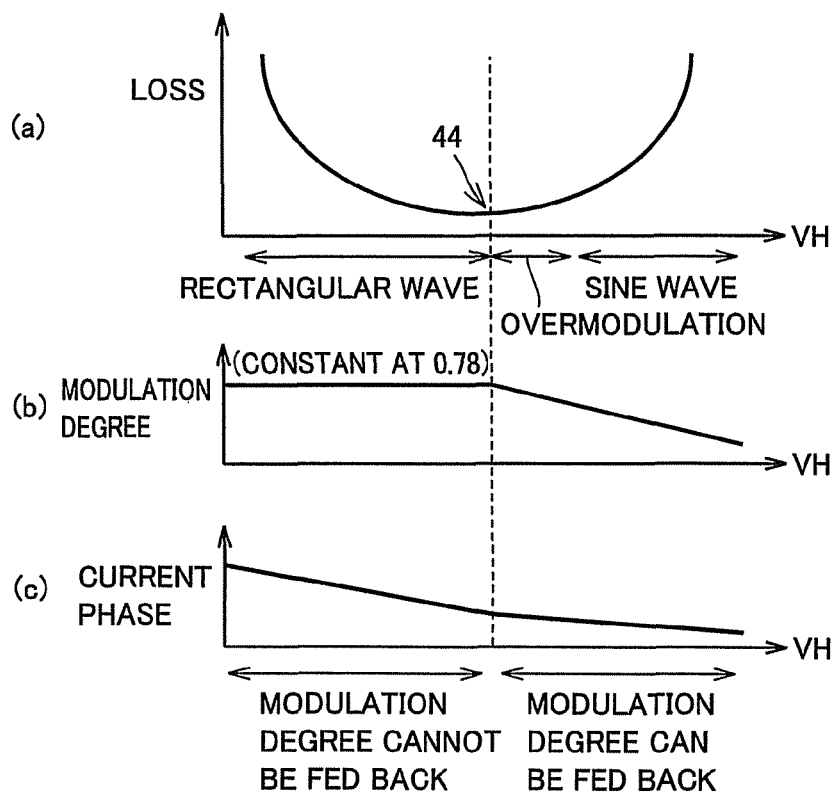
FIG. 10 show conceptual diagrams for illustrating behaviors of the control system in accordance with changes in system voltage through three control modes.

FIG. 10 show conceptual diagrams for illustrating behaviors of the control system in accordance with changes in system voltage VH through three control modes. FIG. 10 shows behaviors for making the output of AC electric motor M1 (rotational speed×torque) identical with system voltage VH being changed.

FIG. 10 shows at (a) the relationship between system voltage VH and the overall loss in the control system through the three control modes. FIG. 10 shows at (b) the relationship between system voltage VH and modulation degree Kmd. FIG. 10 shows at (c) the relationship between system voltage VH and the motor current phase.

Referring to the diagrams shown in FIG. 10 at (a) to (c), in a region where the sine wave PWM control and the overmodulation PWM control are applied, the loss is decreased as system voltage VH is decreased and the modulation degree is increased. At an operating point 44 on the border at which the rectangular wave voltage control is applied, the losses in boost converter 12 and inverter 14 are minimized, so that the loss in the overall system is also minimized.

Since the modulation degree is fixed at 0.78 in the region where the rectangular wave voltage control is applied, voltage phase φv for obtaining identical output is increased as system voltage VH is decreased. Correspondingly, as shown in FIG. 8, since the current phase goes away from optimal current lead angle line 42 (FIG. 8) by the increase in weak field current, the system loss is increased by the increase in the loss in AC electric motor M1. That is, in the rectangular wave voltage control, the loss in the overall system will be increased as system voltage VH is decreased.

In contrast, when the PWM control is applied by raising system voltage VH, the current phase of AC electric motor M1 can be controlled along optimal current lead angle line 42 (FIG. 8). However, when AC electric motor M1 is operated in the PWM control, the loss in inverter 14 will be increased by the increase in the number of times of switching, while the loss in AC electric motor M1 can be reduced.

Therefore, it is when the rectangular wave voltage control is applied and the current phase of AC electric motor M1 is present in proximity to optimal current lead angle line 42 (FIG. 8) that the loss in the overall control system including AC electric motor M1 is minimized. That is, it is preferable to set system voltage VH to attain such a state.

Figure 11:
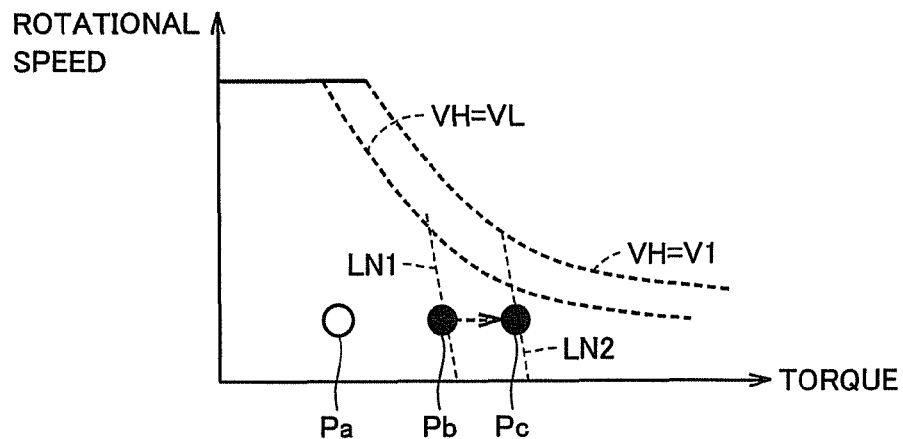
FIG. 11 is a conceptual diagram for illustrating an exemplary transition of the control modes along with changes of operating points of the AC electric motor.

FIG. 11 is a conceptual diagram for illustrating an exemplary transition of the control modes along with changes of operating points of the AC electric motor.

Referring to FIG. 11, an operation of AC electric motor M1 when changes are made from operating point Pa to operating points Pb and Pc by increasing torque at an identical rotational speed will be considered.

When VH=VL holds (at the time of non-boosting), the modulation degree becomes 0.78 on a switching line LN1. That is, switching line LN1 is indicated by the set of operating points at which the modulation degree becomes 0.78 when VH=VL holds. When the operating point of AC electric motor M1 reaches Pb, application of the rectangular wave voltage control is started. By increasing voltage phase φv in the rectangular wave voltage control when VH=VL holds, output torque is further increased from operating point Pb.

When VH=V1 holds, the modulation degree becomes 0.78 on a switching line LN2. That is, switching line LN2 is indicated by the set of operating points at which the modulation degree becomes 0.78 when VH=V1 holds. When output torque is increased further from operating point Pb, and the operating point of AC electric motor M1 reaches operating point Pc on switching line LN2, boosting by boost converter 12 is started so that VH=V1 holds. System voltage VH can thereby be set such that the rectangular wave voltage control is performed in proximity to operating point 44 shown in FIG. 10.

Figure 12:
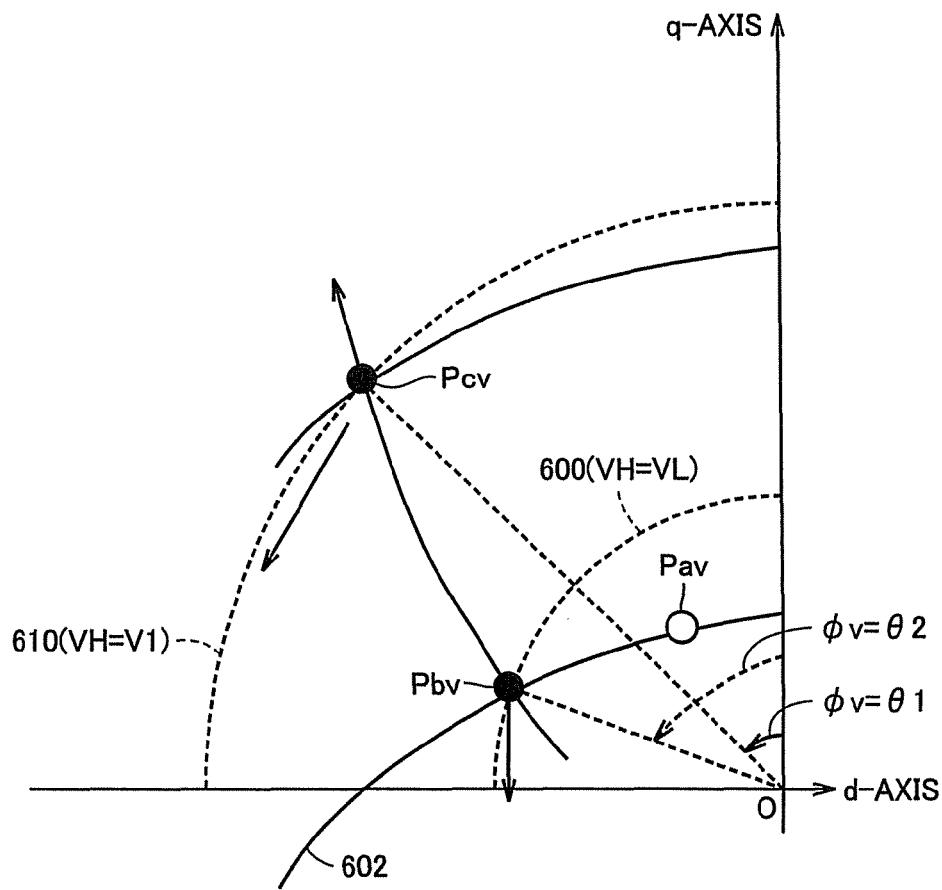
FIG. 12 is a diagram illustrating the locus of voltage vector of the AC electric motor along with the changes of operating points shown in FIG. 11.

FIG. 12 shows the locus of voltage vector in AC electric motor M1 at the operating points shown in FIG. 11. The horizontal axis of FIG. 12 indicates a d-axis voltage (Vd) and the vertical axis indicates a q-axis voltage (Vq).

Referring to FIG. 12, the leading positions of the voltage vector shown by the combination of Vd and Vq at operating points Pa, Pb and Pc of FIG. 11 are Pav, Pbv and Pcv, respectively.

Since VH=VL holds at operating points Pa, Pb and the rotational speed is identical, leading positions Pav and Pbv of the voltage vector are located on an equal voltage line 602 of a motor terminal and in a region within a voltage limiting circle 600 when VH=VL holds (at the time of non-boosting). At operating point Pb where the modulation degree reaches 0.78 and the rectangular wave voltage control is applied, leading position Pbv of the voltage vector reaches the arc of voltage limiting circle 600. At this time, voltage phase φv=θ2 holds. When the rectangular wave voltage control is continued with VH=VL held, the leading position of the voltage vector is moved counterclockwise on voltage limiting circle 600. Voltage phase φv is thereby increased, and output torque is increased.

At operating point Pc, the rectangular wave voltage control is executed in the state where system voltage VH has been boosted so that VH=V1 (V1>VL) holds. Therefore, leading position Pcv of the voltage vector at operating p oint Pc is located on a voltage limiting circle 610 when VH=V1 holds. At this time, voltage phase φv=θ1 (θ1<θ2) holds, which is smaller than the voltage phase at operating point Pb. In this manner, it is understood that by raising system voltage VH, voltage phase φv when the rectangular wave voltage is applied is decreased.

Referring again to FIG. 6, the relationship between VH fluctuations and torque fluctuations relative to voltage phase φv will be considered.

It is understood that, comparing a region in which voltage phase φv is small (e.g., φv=θ1) and a region in which voltage phase φv is large (e.g., =θ2), torque fluctuations relative to fluctuations in system voltage VH increase as the voltage phase is increased.

Therefore, in the case where the rectangular wave voltage control is executed in the region in which the voltage phase is large, there is concern about occurrence of torque fluctuations when fluctuations in system voltage VH occur. On the other hand, as described with reference to FIG. 10, taking the loss in the overall control system into consideration, it is preferable to actively apply the rectangular wave voltage control.

Therefore, in the control system for an AC electric motor according to the present embodiment, the rectangular wave voltage control is applied actively, and AC electric motor M1 is operated such that voltage phase φv in the rectangular wave voltage control does not become excessively large.

For example, in the example of FIG. 6 where the rotational speed is constant, by calculating dT/dVH at each VH and each θ as for the torque operation expression indicated by Expression (4), a limit phase θlm equivalent to the upper limit value of voltage phase φv at which the amount of fluctuations in torque T relative to fluctuations in system voltage VH reaches a predetermined limit value can be previously obtained for each level of system voltage VH. A phase limit line PLN shown in FIG. 6 is equivalent to a set of limit phases θlm in each level of system voltage VH. Limit phase θlm and phase limit line PLN can be previously obtained by simulations or real system experiments based on Expression (4). It is noted that if rotational speed varies, limit phase θlm at an identical system voltage also varies.

In the control system for an AC electric motor according to the first embodiment, system voltage VH is set so as to avoid the rectangular wave voltage control from being performed in the state where voltage phase φv is located in a region on the right side of phase limit line PLN, that is, in a region where voltage phase φv exceeds phase limit line PLN (hereinafter also referred to as a phase limit region).

As described above, FIG. 6 shows the voltage phase-torque characteristic when system voltage VH is varied at an identical rotation angular velocity (rotational speed). The voltage phase for outputting torque Ta is φv=θ2 when VH=VL holds, while required voltage phase φv can be decreased to θa when system voltage VH is boosted to V1. That is, by raising system voltage VH, voltage phase φv required to obtain identical torque T is decreased.

It can be understood that, in the example of FIG. 6, the rectangular wave voltage control is required in the state where the voltage phase is larger than the limit phase (phase limit line PLN) when VH=VL holds (at the time of non-boosting) in order to obtain requested torque Ta, while when VH is boosted to V1, the rectangular wave voltage control in the state where the voltage phase exceeds phase limit line PLN can be avoided.

Therefore, during the PWM control (when the sine wave PWM control or the overmodulation PWM control is applied), in the case where the voltage phase at which a transition is made to the rectangular wave voltage control exceeds phase limit line PLN, it is preferable to boost system voltage VH to reduce the modulation degree without making a transition to the rectangular wave voltage control. Then, the rectangular wave voltage control in the phase limit region can be avoided by continuing the PWM control.

Figure 13:
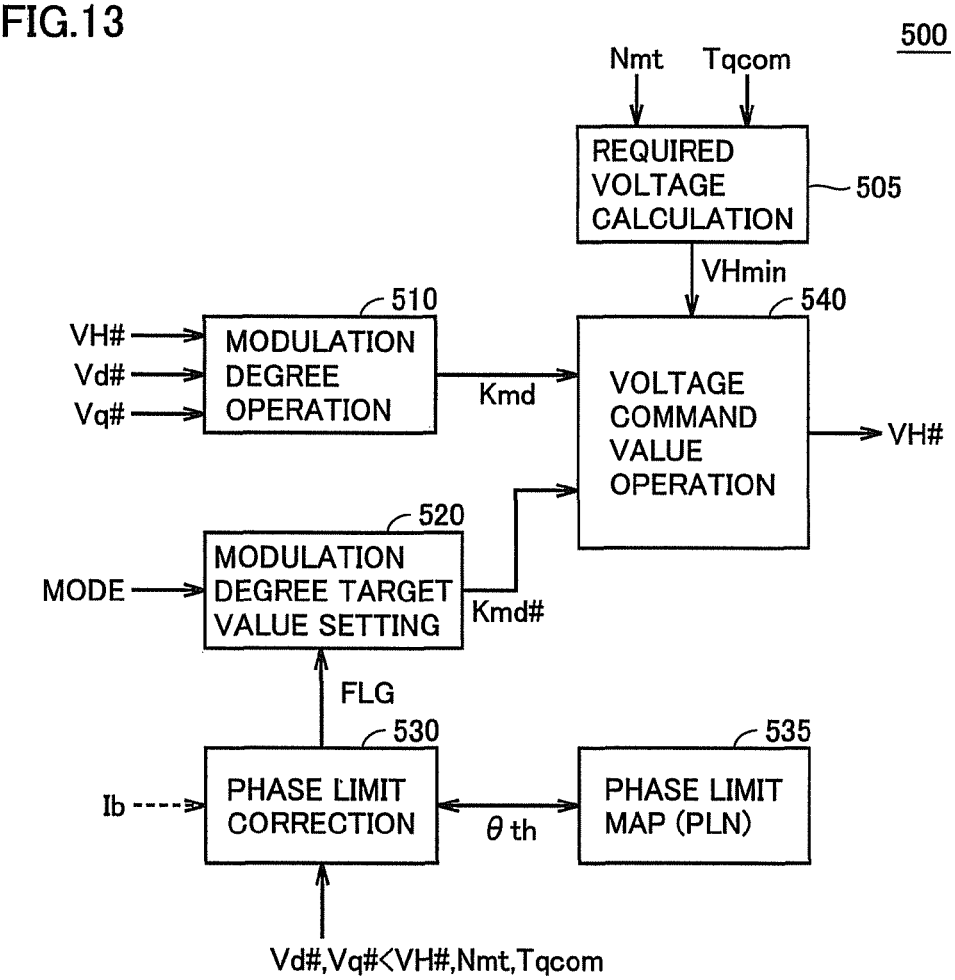
FIG. 13 is a functional block diagram illustrating a control configuration for setting a system voltage command value in the control system for an AC electric motor according to the first embodiment.

FIG. 13 is a functional block diagram illustrating a control configuration for setting a system voltage command value in the control system for an AC electric motor according to the first embodiment.

Referring to FIG. 13, a voltage command value setting unit 500 sets voltage command value VH# for system voltage VH when the PWM control is selected. Voltage command value setting unit 500 has a required voltage calculation unit 505, a modulation degree operation unit 510, a modulation degree target value setting unit 520, a phase limit correction unit 530, a phase limit map 535, and a voltage command value operation unit 540.

Based on the operating state of AC electric motor M1, for example, rotational speed Nmt and torque command value Tqcom, required voltage calculation unit 505 calculates a minimum value VHmin of system voltage VH (hereinafter also referred to as a minimum voltage VHmin) necessary for driving AC electric motor M1 in that operating state.

It is necessary to set system voltage VH at a voltage at least higher than the induced voltage of AC electric motor M1. Moreover, as shown in FIG. 11, the range where AC electric motor M1 is operable varies with system voltage VH. Therefore, minimum voltage VHmin can be set previously in correspondence to variables (rotational speed Nmt and torque command value Tqcom) indicating the operating state of AC electric motor M1. Required voltage calculation unit 505 refers to the map previously stored in control device 30, thereby setting minimum voltage VHmin corresponding to the current operating state of AC electric motor M1 in accordance with the above-described correspondence.

Modulation degree operation unit 510 calculates modulation degree Kmd in accordance with above-described Expression (1) based on voltage command values Vd# and Vq# of the d- and q-axes calculated by PWM control unit 200 (FIG. 3) and system voltage command value VH#.

Modulation degree target value setting unit 520 sets a modulation degree target value Kmd#. As shown in FIG. 10, by applying the rectangular wave voltage control, the loss in the overall control system including AC electric motor M1 can be reduced. Therefore, when the PWM control is selected, modulation degree target value Kmd# is set at approximately 0.78, thereby aiming to reduce the loss in the overall control system.

Voltage command value operation unit 540 calculates a voltage command value VHmd based on the feedback control (modulation degree control) for bringing modulation degree Kmd calculated by modulation degree operation unit 510 closer to modulation degree target value Kmd#. For example, VHmd can be set based on PI control on deviation ΔKmd=Kmd−Kmd#. Alternatively, VHmd can also be set by the product of the ratio (Kmd#/Kmd) and current VH#. Then, voltage command value operation unit 540 sets voltage command value VH# in accordance with the maximum value of either VHmd for modulation degree control or minimum voltage VHmin obtained by required voltage calculation unit 505. In this manner, voltage command value operation unit 540 is intended to set system voltage VH such that modulation degree Kmd approaches a target value (approximately 0.78) in the range where VH#≥VHmin holds.

Phase limit map 535 previously stores limit phase θth constituting phase limit line PLN shown in FIG. 6. As described above, limit phase θth is set for each system voltage VH and each motor rotation speed Nmt. Therefore, phase limit map 535 is configured such that limit phase θth is read with system voltage VH and motor rotational speed Nmt serving as arguments.

Phase limit correction unit 530 reads limit phase θth with reference to phase limit map 535 based on system voltage VH and motor rotational speed Nmt at present. Phase limit correction unit 530 further calculates voltage phase φv in accordance with the voltage vector diagram shown in FIG. 12 based on voltage command values Vd# and Vq# of the d- and q-axes. Phase limit correction unit 530 then compares the calculated voltage phase and limit phase θth, and when the voltage phase is larger than limit phase θth, turns on a flag FLG for conducting phase limit correction control. Otherwise, flag FLG is off. Phase limit correction unit 530 corresponds to an embodiment of "a phase restriction control unit."

When flag FLG is off, modulation degree target value setting unit 520 sets modulation degree target value Kmd# at a default value (approximately 0.78) as described above. On the other hand, when flag FLG is turned on to conduct the phase limit correction control, modulation degree target value setting unit 520 makes modulation degree target value Kmd# smaller than the default value. Accordingly, setting of voltage command value VH# is corrected to a direction in which system voltage VH is raised, so that the modulation degree is decreased. Therefore, a transition from the PWM control to the rectangular wave voltage control is prevented from being made at the voltage phase at present exceeding limit phase θth. As a result, the rectangular wave voltage control can be avoided from being conducted in the phase limit region.

It is noted that the determination by phase limit correction unit 530 can also be executed based only on the operating point of AC electric motor M1. From the torque operation expression shown in Expression (4), voltage phase φv when the rectangular wave voltage control is applied at each operating point of AC electric motor M1 can be obtained in each level of system voltage VH. Therefore, in each level of system voltage VH, the operating point region where voltage phase φv thus obtained exceeds limit phase θth (a function of VH and Nmt) can be previously obtained.

Figure 14:
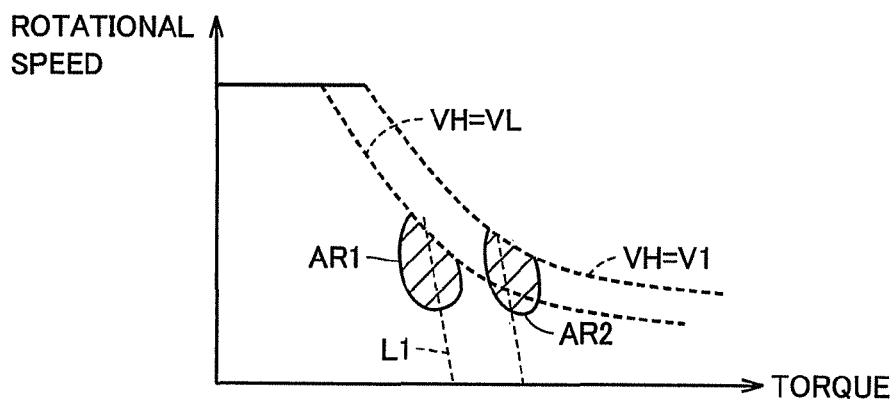
FIG. 14 is a conceptual diagram for illustrating necessity determination of phase limit correction control based on operating points of the AC electric motor.

FIG. 14 is a conceptual diagram for illustrating necessity determination of phase limit correction control based on operating points of the AC electric motor.

For example, FIG. 14 illustrates an operating point region (also referred to as a phase limit region) AR1 where voltage phase φv exceeds limit phase θth when VH=VL holds (at the time of non-boosting) and a phase limit region AR2 when VH=V1 holds (after boosting). The phase limit region in each level of system voltage VH can be previously set by simulations, real system examinations, or the like based on Expression (4).

Phase limit correction unit 530 determines whether or not the current operating point of AC electric motor M1 falls within the phase limit region, based on motor rotational speed Nmt and torque command value Tqcom at present. When the current operating point falls within the phase limit region, flag FLG is turned on. Otherwise, flag FLG is off. In this case, phase limit map 535 can be configured so as to previously store the motor rotational speed and torque that define the border of the phase limit region corresponding to each level of system voltage VH.

In this manner, according to the control system for an AC electric motor according to the first embodiment, in the case where the voltage phase falls within the phase limit region when the PWM control is selected, system voltage VH is raised to prevent a transition to the rectangular wave voltage control. The rectangular wave voltage control in which voltage phase φv falls within the phase limit region can thereby be prevented from being conducted. At this time, it is not necessary to change the carrier frequencies of the converter and the inverter. Therefore, fluctuations in output torque of the AC electric motor can be restrained without increasing electromagnetic noise.

[Variation of First Embodiment]

In the control system for an AC electric motor according to the first embodiment, the opportunity of applying the rectangular wave voltage control is reduced by the phase limit correction control so as to prevent torque fluctuations in the rectangular wave voltage control. This is not preferable in terms of reduction in loss in the control system. On the other hand, if fluctuations in system voltage VH do not occur, torque fluctuations will not occur even if the voltage phase in the rectangular wave voltage control is large. Therefore, execution of the phase limit correction control is preferably applied only in the state where there is concern about fluctuations in system voltage VH.

For example, as described in PTD 1 as well, when a passing current of reactor L1 of boost converter 12, that is, input/output current Ib of DC power source B is around zero, fluctuations in system voltage VH are likely to occur under the influence of dead time in converter control. Therefore, the phase limit correction control is preferably executed only in the case where current Ib is around zero.

Figure 15:
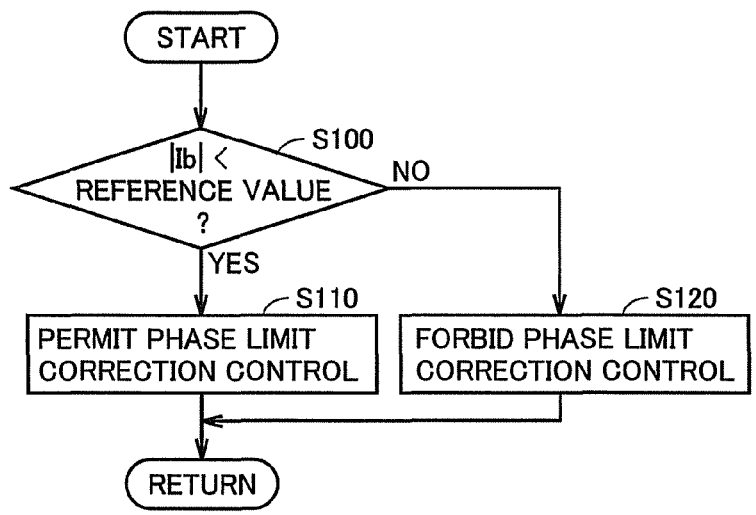
FIG. 15 is a flowchart illustrating control processing in a control system for an AC electric motor according to a variation 1 of the first embodiment.

FIG. 15 is a flowchart illustrating control processing in a control system for an AC electric motor according to a variation 1 of the first embodiment. Control processing shown in FIG. 15 is further executed as a function of phase limit correction unit 530 of FIG. 13 in addition to the control processing in the first embodiment.

Referring to FIG. 15, phase limit correction unit 530 (control device 30) determines in step S100 whether there is concern about fluctuations in system voltage VH. For example, it is determined in step S100 whether or not the absolute value of input/output current Ib of DC power source B has been dropped to a level in which voltage fluctuations occur under the influence of dead time. Specifically, it is determined whether or not |Ib| is smaller than a reference value based on the detection value obtained by current sensor 11. The reference value can be previously set based on the result of simulations or real system experiments of boost converter 12.

When |Ib| is smaller than the reference value, phase limit correction unit 530 (control device 30) advances the process to step S110 to permit the phase limit correction control. Accordingly, as described in the first embodiment, when flag FLG is turned on, modulation degree target value Kmd# is decreased so as to raise system voltage VH.

On the other hand, when |Ib| is more than or equal to the reference value, phase limit correction unit 530 (control device 30) advances the process to step S120 to forbid the phase limit correction control. In this case, flag FLG is maintained off irrespective of the operating state of AC electric motor M1. Accordingly, system voltage VH is set so as to minimize the loss in the overall system.

With such a configuration, in the control system for an AC electric motor according to the variation of the first embodiment, correction of system voltage VH for restricting the voltage phase is executed only in the situation where there is a factor for causing system voltage VH to fluctuate. Therefore, in the situation where there is a factor for causing system voltage VH to fluctuate, the rectangular wave voltage control can be prevented from being conducted in the phase limit region, similarly to the first embodiment. Otherwise, voltage command value VH# can be set so as to minimize the loss in the overall system. As a result, the power loss can be reduced as compared with the control system for an AC electric motor according to the first embodiment.

[Second Embodiment]

In the first embodiment, execution of the rectangular wave voltage control in a range where the voltage phase is large is avoided by raising system voltage VH so as to avoid the transition from the PWM control to the rectangular wave voltage control. The second embodiment will describe control for restricting the voltage phase when the rectangular wave voltage control is applied.

Figure 16:
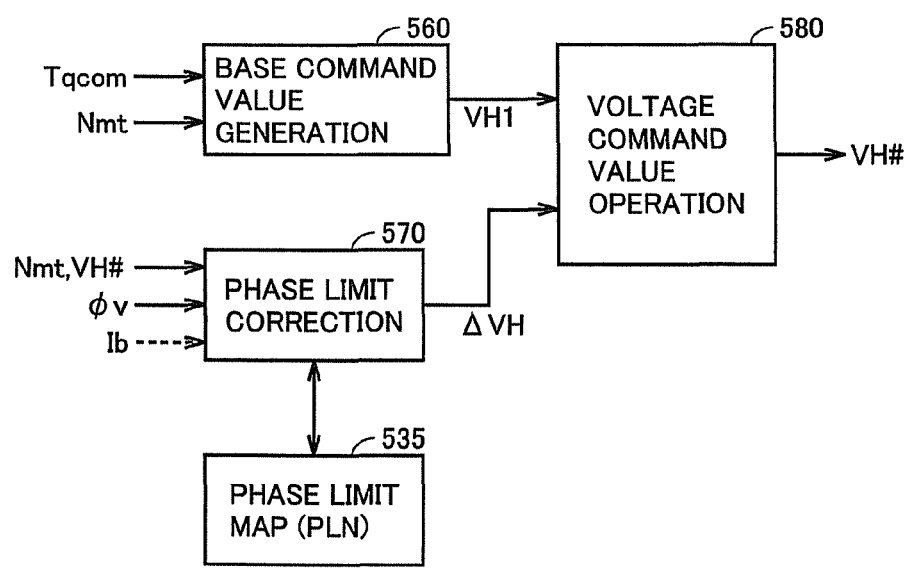
FIG. 16 is a functional block diagram illustrating a control configuration for setting a system voltage command value in a control system for an AC electric motor according to a second embodiment.

FIG. 16 is a functional block diagram illustrating a control configuration for setting a system voltage command value in a control system for an AC electric motor according to a second embodiment.

Referring to FIG. 16, voltage command value setting unit 500# according to the second embodiment sets voltage command value VH# for system voltage VH when the rectangular wave voltage control is selected.

Voltage command value setting unit 500# has phase limit map 535, a base command value generation unit 560, a phase limit correction unit 570, and a voltage command value operation unit 580.

Phase limit map 535 is configured such that limit phase θth constituting phase limit line PLN shown in FIG. 6 is read with system voltage VH and motor rotational speed Nmt serving as arguments, similarly to the map shown in FIG. 13.

Based on the operating state (torque command value Tqcom and rotational speed Nmt) of AC electric motor M1, base command value generation unit 560 generates a base command value VH1 previously set in correspondence to the operating point. Base command value VH1 is more than or equal to minimum voltage Vmin described with reference to FIG. 6. For example, in order to reduce the loss in boost converter 12, base command value VH1 is determined such that VH1=VL holds (that is, non-boosting) in a region on the inner side of the maximum output line when VH=VL holds. For example, a map for setting base command value VH1 in correspondence to variables (rotational speed Nmt and torque command value Tqcom) indicating the operating state of AC electric motor M1 can be previously stored in control device 30.

Base command value generation unit 560 refers to the above-mentioned map to read a map value VH1m of the base command value in accordance with the current operating state. Furthermore, by filtering processing on voltage command value VH# at present, base command value VH1 can be set in accordance with Expression (6) indicated below, for example. In Expression (6), $\alpha$ is a coefficient of filtering processing ($0<\alpha<1$).

$$VH1=(1-\alpha)\cdot VH\#+\alpha\cdot VH1m \quad (6)$$

Phase limit correction unit 570 determines necessity of phase limit correction control based on system voltage VH# and voltage phase φv at present. That is, phase limit correction unit 570 reads limit phase θth from phase limit map 535 based on system voltage VH# and rotational speed Nmt at present, and compares voltage phase φv at present with phase limit θth.

When φv>θth holds, phase limit correction unit 570 determines that the phase limit correction control is necessary, and sets correction value ΔVH so as to raise voltage command value VH#. That is, ΔVH>0 holds. For example, ΔVH can be set based on the phase difference between voltage phase φv at present and limit phase θth. On the other hand, when φv≤θth holds, phase limit correction unit 570 sets ΔVH=0. Phase limit correction unit 570 corresponds to an embodiment of "a phase restriction control unit."

Voltage command value operation unit 580 generates voltage command value VH# for the system voltage in accordance with the sum of base command value VH1 from base command value generation unit 560 and corrected value ΔVH from phase limit correction unit 570 (VH#=VH1+ΔVH).

In this manner, with the control system for an AC electric motor according to the present second embodiment, when voltage phase φv is increased during the rectangular wave voltage control, system voltage VH is raised. The rectangular wave voltage control can thereby be prevented from being conducted in the state where voltage phase φv exceeds phase limit line PLN, that is, within the phase limit region. At this time, similarly to the first embodiment, it is not necessary to change the carrier frequencies of the converter and the inverter. Therefore, fluctuations in output torque of the AC electric motor can be restrained without increasing electromagnetic noise.

It is noted that, in the second embodiment as well, the control processing shown in FIG. 15 may be applied to execute correction of system voltage VH for restricting the voltage phase only in the situation where there is a factor for causing system voltage VH to fluctuate (e.g., when is smaller than the reference value). In this case, when |Ib| is more than or equal to the reference value, phase limit correction unit 570 fixes ΔVH at 0 irrespective of voltage phase φv at present.

[Third Embodiment]

As described above, AC electric motor M1 to be subjected to control in the present embodiment is representatively a traction motor of an electric-powered vehicle. A plurality of AC electric motors may be mounted on an electric-powered vehicle. With such a configuration, in the case where inverters for controlling a plurality of AC electric motors, respectively, has a common DC link voltage, it is important to prevent torque fluctuations in a specific AC electric motor having a great influence on vehicle driving force.

Figure 17:
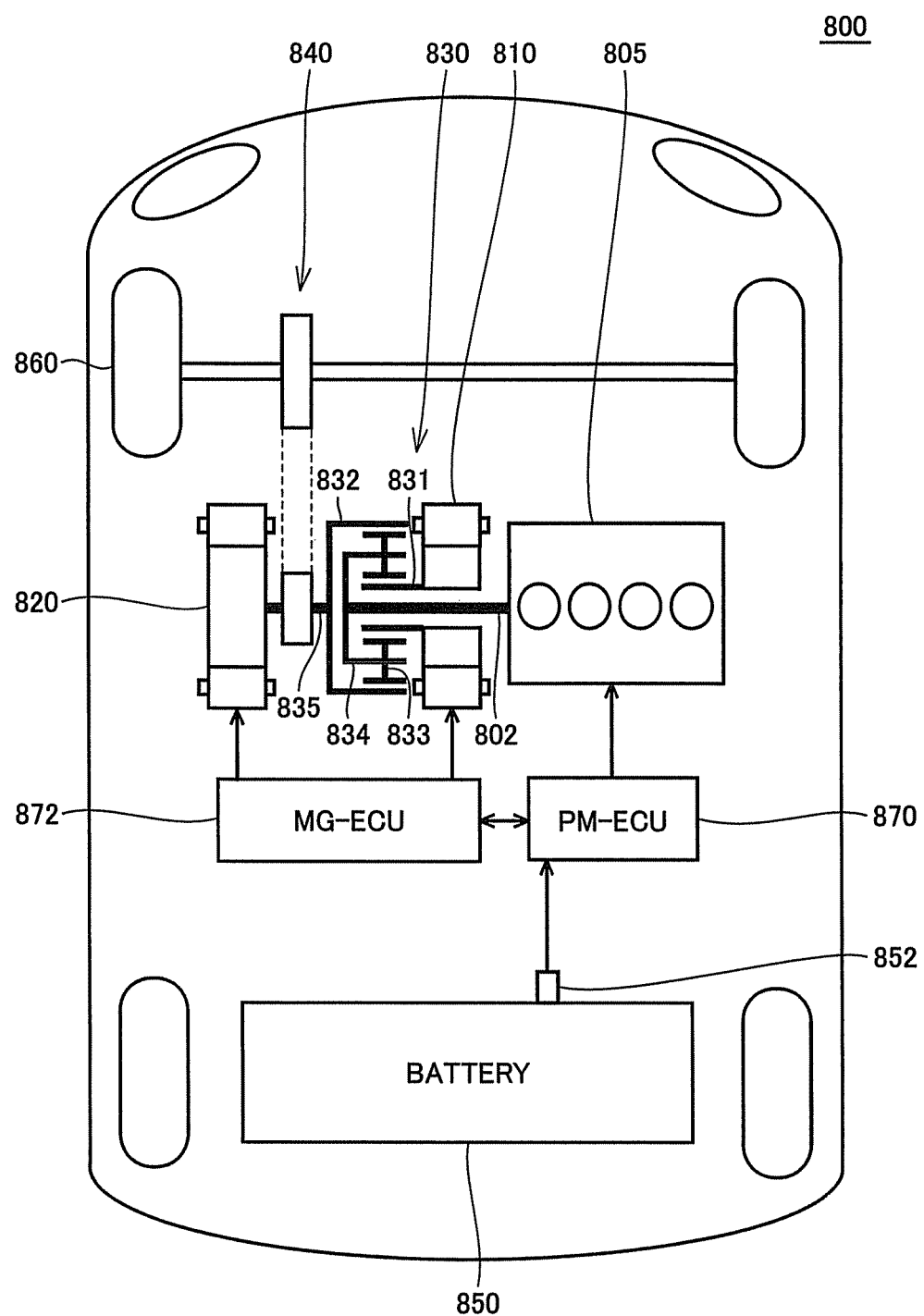
FIG. 17 is a schematic block diagram illustrating an exemplary configuration of an electric-powered vehicle on which a control system for an AC electric motor according to a third embodiment of the present invention is mounted.

FIG. 17 is a schematic block diagram illustrating an exemplary configuration of an electric-powered vehicle on which a control system for an AC electric motor according to a third embodiment of the present invention is mounted.

Referring to FIG. 17, a hybrid vehicle 800 shown as a representative example of an electric-powered vehicle includes an engine 805, a first MG (Motor Generator) 810 (hereinafter also referred to as "MG1"), a second MG 820 (hereinafter also referred to as "MG2"), a power split device 830, reduction gears 840, a battery 850, a driving wheel 860, a PM (Power train Manager)-ECU (Electronic Control Unit) 870, and an MG (Motor Generator)-ECU 872.

Hybrid vehicle 800 runs by means of driving force from at least one of engine 805 and MG2. Engine 805, MG1 and MG2 are coupled via power split device 830.

Power split device 830 is representatively implemented as a planetary gear mechanism. Power split device 830 includes a sun gear 831 as an external gear, ring gear 832 as an internal gear arranged on a concentric circle with this sun gear 831, a plurality of pinion gears 833 in meshing engagement with sun gear 831 and with ring gear 832, and a carrier 834. Carrier 834 is constructed to hold plurality of pinion gears 833 such that they can rotate and revolve.

Sun gear 831 is coupled to the output shaft of MG1. Ring gear 832 is supported rotatably and coaxially with a crankshaft 802. Pinion gears 833 are arranged between sun gear 831 and ring gear 832, and revolve around the outer circumference of sun gear 831 while rotating. Carrier 834 is coupled to an end of crankshaft 802 to support the rotation shaft of each pinion gear 833.

Sun gear 831 and a ring gear shaft 835 rotate with the rotation of ring gear 832. The output shaft of MG2 is coupled to ring gear shaft 835. Hereinafter, ring gear shaft 835 will also be referred to as driving shaft 835.

It is noted that the output shaft of MG2 may be coupled to driving shaft 835 via a transmission. In the present embodiment, for illustrating a structure provided with no transmission, the rotational speed ratio between MG2 and ring gear (driving shaft) 835 is 1:1. In the structure provided with a transmission, the ratios of the rotational speed and torque between driving shaft 835 and MG2 are determined by the gear ratio.

Driving shaft 835 is mechanically coupled to driving wheel 860 via reduction gears 840. Therefore, motive power output by power split device 830 to ring gear 832, that is, to driving shaft 835 will be output to driving wheel 860 via reduction gears 840. It is noted that although driving wheel 860 is shown as a front wheel in the example of FIG. 17, driving wheel 860 may be a rear wheel, or may be a front wheel and a rear wheel.

Power split device 830 performs a differential operation with sun gear 831, ring gear 832 and carrier 834 serving as rotating elements. These three rotating elements are mechanically coupled to three shafts, namely, crankshaft 802 of engine 805, the output shaft of MG1 and driving shaft 835.

Motive power produced by engine 805 is split into two paths by power split device 830. One of the paths is to drive driving wheel 860 via reduction gears 840. The other path is to drive MG1 for power generation. When MG1 functions as an electric power generator, power split device 830 distributes motive power from engine 805 received via carrier 834 to the sun gear 831 side and the ring gear 832 side in accordance with the gear ratio. On the other hand, when MG1 functions as an electric motor, power split device 830 combines motive power from engine 805 received via carrier 834 and motive power from MG1 received via sun gear 831 for output to ring gear 832.

Representatively, MG1 and MG2 are three-phase AC rotating electric machines implemented by permanent magnet motors.

MG1 mainly operates as "an electric power generator", and can generate electric power by means of driving force of engine 805 split by power split device 830. Electric power generated by MG1 is properly used in accordance with the running state of the vehicle and/or the state of SOC (State Of Charge) of battery 850. For example, during normal running, the electric power generated by MG1 directly serves as electric power that drives MG2. On the other hand, when SOC of battery 850 is lower than a predetermined value, electric power generated by MG1 is converted from an alternating current into a direct current by inverters which will be described later. Then, the voltage is adjusted by a converter which will be described later, and is stored in battery 850. It is noted that, in the case of carrying out motoring of engine 805 at the engine start, or the like, MG1 is also capable of operating as an electric motor as a result of torque control.

MG2 mainly operates as "an electric motor", and is driven by at least one of electric power stored in battery 850 and electric power generated by MG1. Motive power produced by MG2 is conveyed to driving shaft 835, and is further conveyed to driving wheel 860 via reduction gears 840. Accordingly, MG2 assists engine 805, and causes the vehicle to run with motive power from MG2.

During regenerative braking of the hybrid vehicle, MG2 is driven by driving wheel 860 via reduction gears 840. In this case, MG2 operates as an electric power generator. Accordingly, MG2 functions as a regenerative brake that converts braking energy into electric power. Electric power generated by MG2 is stored in battery 850.

Battery 850 is a battery pack obtained by connecting a plurality of battery modules in series, each of the battery modules being obtained by integrating a plurality of battery cells. Battery 850 has a voltage of approximately 200V, for example. Battery 850 can be charged with electric power generated by MG1 or MG2. The temperature, voltage and current of battery 850 are detected by a battery sensor 852. Battery sensor 852 comprehensively represents a temperature sensor, a voltage sensor and a current sensor.

Electric power to be charged into battery 850 is restricted so as not to exceed an upper limit value WIN. Similarly, electric power to be discharged from battery 850 is restricted so as not to exceed an upper limit value WOUT. Upper limit values WIN and WOUT are determined based on various parameters, such as SOC, temperature and rate of change of temperature of battery 850.

PM-ECU 870 and MG-ECU 872 are configured to include a CPU (Central Processing Unit) and a memory neither shown, and are configured to execute arithmetic operations based on the detection values obtained by the respective sensors by software processing in accordance with a map and a program stored in the memory. Alternatively, at least a part of ECU may be configured to execute a predetermined numerical arithmetic operation and/or a logical operation by hardware processing by a dedicated electronic circuit or the like.

Engine 805 is controlled in accordance with a control target value received from PM-ECU 870. MG1 and MG2 are controlled by MG-ECU 872. PM-ECU 870 and MG-ECU 872 are connected to be capable of communicating with each other bidirectionally. PM-ECU 870 generates control target values (representatively, torque target values) for engine 805, MG1 and MG2 by running control which will be described later.

MG-ECU 872 controls MG1 and MG2 in accordance with the control target values transferred from PM-ECU 870. It is noted that engine 805 controls the fuel injection quantity, ignition timing and the like in accordance with operation target values (representatively, torque target values and rotational speed target values) received from PM-ECU 870.

Figure 18:
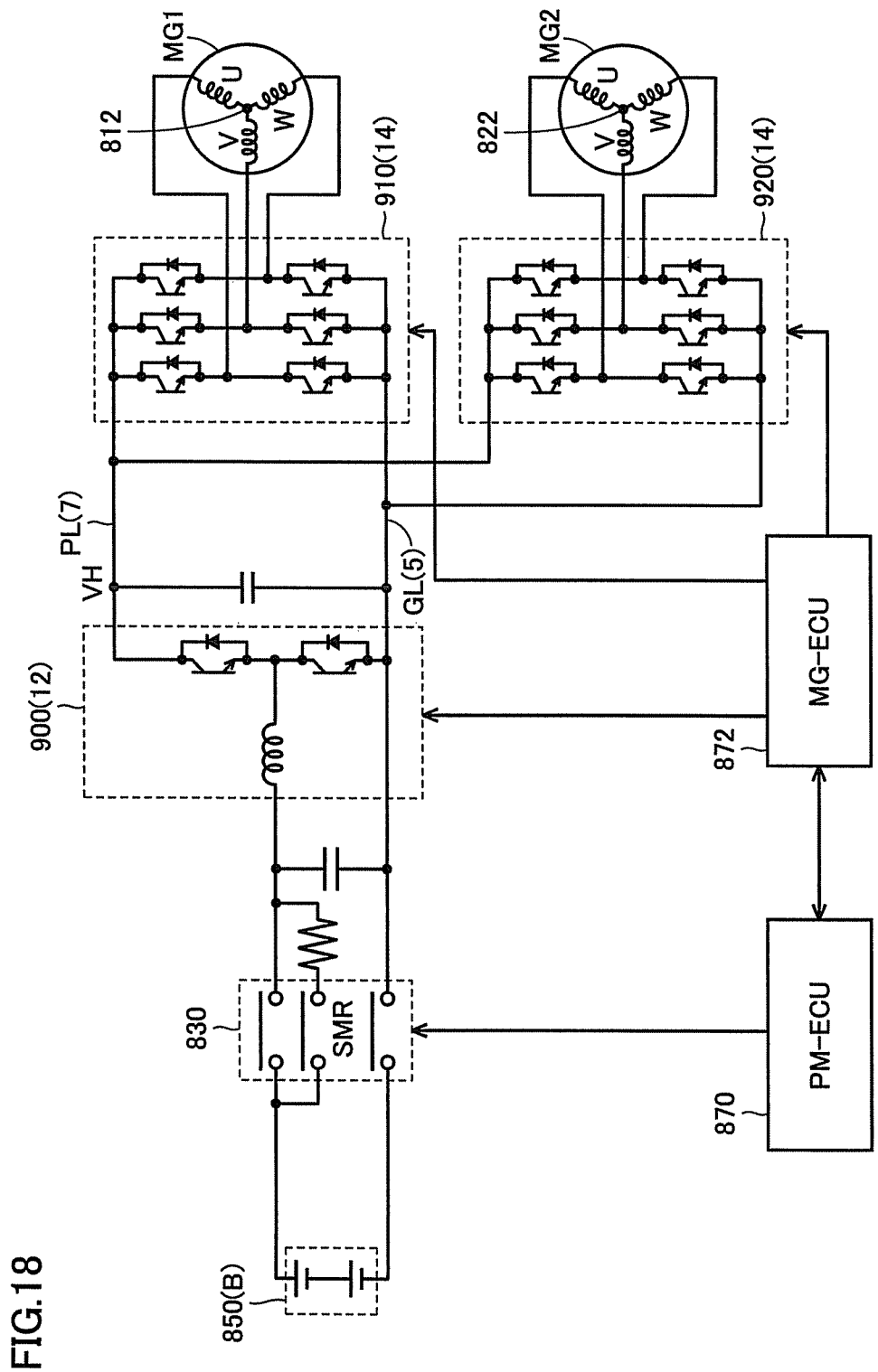
FIG. 18 is a circuit diagram illustrating an exemplary configuration of the control system for an AC electric motor mounted on the hybrid vehicle shown in FIG. 17.

FIG. 18 is a circuit diagram illustrating an exemplary configuration of the control system for an AC electric motor mounted on the hybrid vehicle shown in FIG. 17.

Referring to FIG. 18, the electrical system of the hybrid vehicle is provided with an SMR 830, a converter 900, an inverter 910 corresponding to MG1, and an inverter 920 corresponding to MG2.

The control system for an AC electric motor shown in FIG. 18 is obtained by extending the control system for an AC electric motor shown in FIG. 1 so as to control two AC electric motors MG1 and MG2. Battery 850 corresponds to DC power source B of FIG. 1, and SMR 830 corresponds to system relays SR1 and SR2 of FIG. 1. Converter 900 is configured similarly to boost converter 12 of FIG. 1, and controls DC voltage VH (system voltage VH) on electric power line PL in accordance with voltage command value VH#.

Each of inverters 910 and 920 is configured similarly to inverter 14 of FIG. 1. The direct current sides of inverters 910 and 920 are connected to common electric power lines PL and GL. Electric power lines PL and GL correspond to electric power lines 7 and 5 of FIG. 1, respectively. Therefore, inverters 910 and 920 each convert common system voltage VH into an AC voltage for supply to MG1 and MG2, respectively.

MG1 has a U-phase coil, a V-phase coil and a W-phase coil star-connected to one another, as stator windings. One ends of the respective phase coils are connected to one another at a neutral point 812. The other end of each phase coil is connected to the node of the switching elements of each phase arms of inverter 910. Similarly to MG1, MG2 has a U-phase coil, a V-phase coil and a W-phase coil star-connected to one another, as stator windings. One ends of the respective phase coils are connected to one another at a neutral point 822. The other end of each phase coil is connected to the node of the switching elements of each phase arms of inverter 920.

MG-ECU 872 corresponds to control device 30 of FIG. 1. PM-ECU 870 generates torque command values Tqcom1 and Tqcom2 for MG1 and MG2 as part of controlling the overall operation of hybrid vehicle 800. MG-ECU 872 controls inverters 910 and 920 such that output torques of MG1 and MG2 have torque command values Tqcom1 and Tqcom2, respectively. Each of MG1 control and MG2 control by inverters 910 and 920 is executed similarly to control of AC electric motor M1 by inverter 14.

Furthermore, PM-ECU 870 sets a command value for system voltage VH in accordance with the operating state of MG1, MG2, and controls converter 900 such that system voltage VH has voltage command value VH#.

Figure 19:
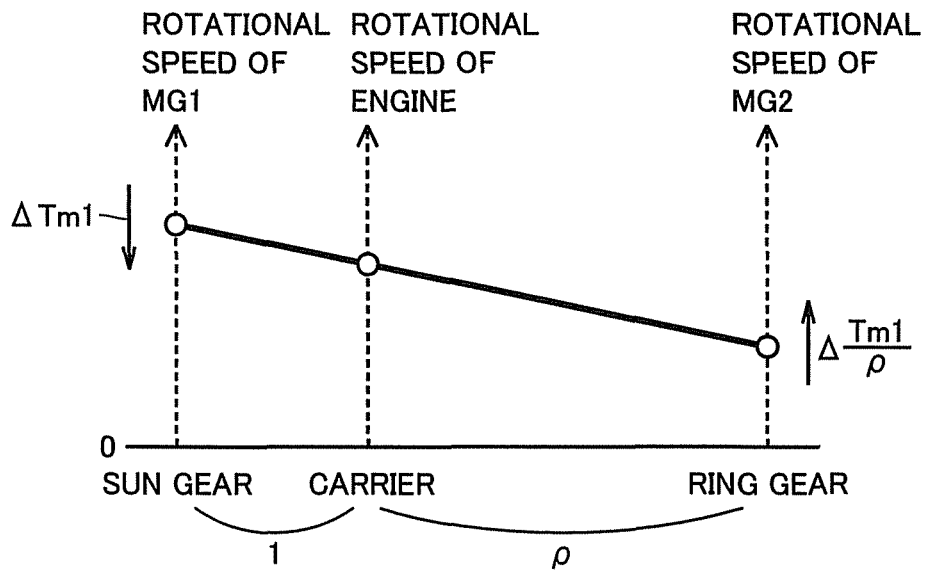
FIG. 19 is a nomographic chart showing the relationship among rotational speeds of engine, MG1 and MG2 in the hybrid vehicle shown in FIG. 17.

In hybrid vehicle 800, engine 805, MG1 and MG2 are coupled to one another via a planetary gear. Therefore, the rotational speeds of engine 805, MG1 and MG2 have the relationship connected to one another with a straight line in a nomographic chart, as shown in FIG. 19.

In hybrid vehicle 800, running control for performing running suited to the vehicular state is executed by PM-ECU 870. For example, at the time of vehicle start and during low-speed running, the hybrid vehicle runs by means of the output of MG2 with engine 805 stopped. At this time, the rotational speed of MG2 is higher than zero, and the rotational speed of MG1 is lower than zero.

During steady running, the rotational speed of MG1 is made higher than zero by causing MG1 to operate as an electric motor such that engine 805 is cranked using MG1. In this case, MG1 operates as an electric motor. Then, engine 805 is started, and the hybrid vehicle runs by means of the outputs of engine 805 and MG2. In this manner, hybrid vehicle 800 is improved in fuel efficiency by operating engine 805 at a highly-efficient operating point.

Figure 20:
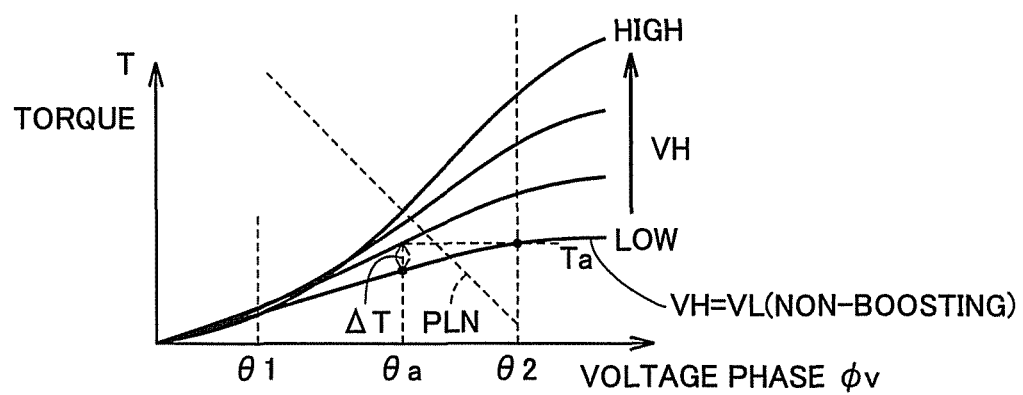
FIG. 20 is a conceptual diagram illustrating control for avoiding rectangular wave voltage control in a region beyond a phase limit line in the control system for an AC electric motor according to the third embodiment of the present invention.

FIG. 20 is a conceptual diagram illustrating control for avoiding rectangular wave voltage control in a phase limit region in the control system for an AC electric motor according to the third embodiment of the present invention.

Referring to FIG. 20, the case in which torque command value Tqcom2 for MG2 which is a traction motor is Ta is considered. At this time, in the state where VH=VL holds (non-boosting), the rectangular wave voltage control is required at voltage phase $\phi v=\theta 2$, that is, within the phase limit region.

Torque fluctuations in MG2 directly influence fluctuations in vehicle driving force, and therefore greatly influence the running performance. Therefore, in the control system for an AC electric motor according to the third embodiment, the output torque of MG2 is reduced to avoid MG2 from being subjected to the rectangular wave voltage control in the region where voltage phase $\phi v$ exceeds phase limit line PLN.

For example, as illustrated in FIG. 20, when reducing Tqcom2 by $\Delta T$ with VH=VL held, required voltage phase $\phi v$ is decreased to $\theta a$. Accordingly, the rectangular wave voltage control can be applied to MG2 in the range not exceeding phase limit line PLN.

Furthermore, the output torque of MG1 is corrected such that torque (i.e., vehicle driving force) output to a driving shaft 135 is maintained even if the output torque of MG2 is reduced by $\Delta T$.

Referring again to the nomographic chart of FIG. 19, when regeneration torque (negative torque) of MG1 is increased by $\Delta Tm1$, output torque (positive torque) of driving shaft 135 can be increased by $(\Delta Tm1/\rho)$ obtained by dividing $\Delta Tm1$ by gear ratio $\rho$ of power split device 830. Therefore, when the output torque (positive torque) of MG2 is decreased by $\Delta T$, the magnitude of regeneration torque of MG1 is increased by $\Delta T \cdot \rho$. The torque output to driving shaft 135 can thereby be maintained at a level equivalent to that before correcting torque of MG2.

In this manner, MG2 which is a traction motor can be avoided from being subjected to the rectangular wave voltage control within the phase limit region, while vehicle driving force is maintained.

Figure 21:
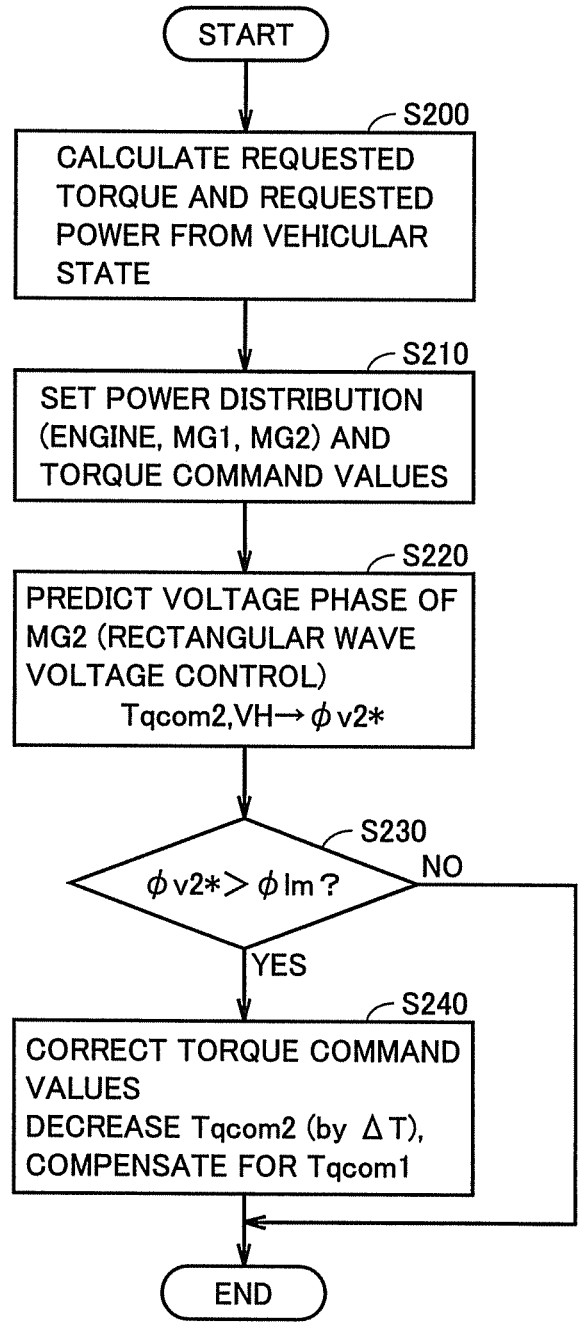
FIG. 21 is a flowchart illustrating control processing of phase limit correction control in the control system for an AC electric motor according to the third embodiment.

FIG. 21 is a flowchart illustrating control processing of phase limit correction control in the control system for an AC electric motor according to the third embodiment. Control processing shown in FIG. 21 is executed by PM-ECU 870 at a predetermined cycle.

Referring to FIG. 21, PM-ECU 870 calculates in step S200 requested torque and requested power based on the state of hybrid vehicle 800. For example, requested torque to be output to driving shaft 835 is calculated in accordance with the vehicular speed and the press-down degree of an accelerator pedal of hybrid vehicle 800. Furthermore, requested power is calculated in accordance with the product of the requested torque and the rotational speed of driving shaft 835. When SOC of battery 850 has dropped to require charging, power for charging battery 850 is added to the requested power.

PM-ECU 870 determines in step S210 power distribution to share the requested power calculated in step S200 among engine 805, MG1 and MG2. Basically, the power distribution is determined to be maximum for hybrid vehicle 800. For example, the power distribution is determined such that the operating point of engine 805 is set at the maximum efficiency point, and excess and shortage relative to the requested torque is adjusted by MG1 and MG2. Along with this power distribution, torque command values Tqcom1 and Tqcom2 for MG1 and MG2 are determined. That is, the function of "a torque command value setting unit" is achieved by processing of step S210 by PM-ECU 870.

PM-ECU 870 predicts in step S220, for MG2, a predicted value $\phi v2^*$ of a voltage phase when MG2 is subjected to the rectangular wave voltage control in accordance with torque command value Tqcom2 at present. For example, a prediction map for obtaining voltage phase predicted value $\phi v2^*$ from the combination of rotational speed and system voltage for each level of torque command value can be set previously.

PM-ECU 870 compares in step S230 voltage phase predicted value $\phi v2^*$ obtained in step S220 with limit phase $\theta th$. Limit phase $\theta th$ can be obtained by reference to phase limit map 535 (FIG. 13) similarly to the first embodiment.

When the rectangular wave voltage control is applied to MG2 and $\phi 2^* > \theta th$ holds (YES in S230), PM-ECU 870 advances the process to step S240 to correct the torque command values for MG1 and MG2. Specifically, torque command value Tqcom2 is reduced by $\Delta T$ such that a voltage phase $\phi v2$ of MG2 falls below limit phase $\theta th$. Furthermore, torque command value Tqcom for MG1 is corrected so as to compensate for the decrease in the output torque from MG2 to driving shaft 835 by $\Delta T$. Accordingly, MG2 can be avoided from being subjected to the rectangular wave voltage control within the phase limit region, while the torque output to driving shaft 135 is maintained. That is, the functions of "a phase restriction control unit" and "a torque command value correction unit" are achieved by processing of step S240 by PM-ECU 870.

It is noted that torque correction amount $\Delta T$ of MG2 is preferably set in accordance with system voltage VH as well as the torque command value and rotational speed of MG2. The torque correction amount of MG1 can be calculated from torque correction amount $\Delta T$ of MG2 and the gear ratio of power split device 830, as described with reference to FIG. 19. In general, reduction in power running torque by MG2 can be compensated for by increasing regeneration torque produced by MG1.

On the other hand, PM-ECU 870 skips the processing of step S240 when the rectangular wave voltage control within the phase limit region is not required (NO in S230). Therefore, torque command values Tqcom1 and Tqcom2 set in step S210 are maintained. The torque control of MG1 and MG2 in response to torque command values Tqcom1 and Tqcom2 is executed by applying any of the three control modes, as described in the first embodiment.

In this manner, according to the control system for an AC electric motor according to the present third embodiment, in the electric-powered vehicle configured such that a plurality of AC electric motors are controlled by a plurality of inverters having a DC link voltage in common, torque command values, that is, the power distribution can be corrected so as to avoid the traction motor from being subjected to the rectangular wave voltage control within the phase limit region, while vehicle driving force is maintained. Accordingly, torque fluctuations in the traction motor (MG2) relative to fluctuations in system voltage VH can be restrained. This can be prevent deterioration in running performance due to fluctuations in vehicle driving force of the electric-powered vehicle.

Also in the third embodiment, it is not necessary to change the carrier frequencies of the converters and the inverters, similarly to the first and second embodiments. Fluctuations in output torque of the AC electric motor can thereby be restrained without increasing electromagnetic noise.

Figure 22:
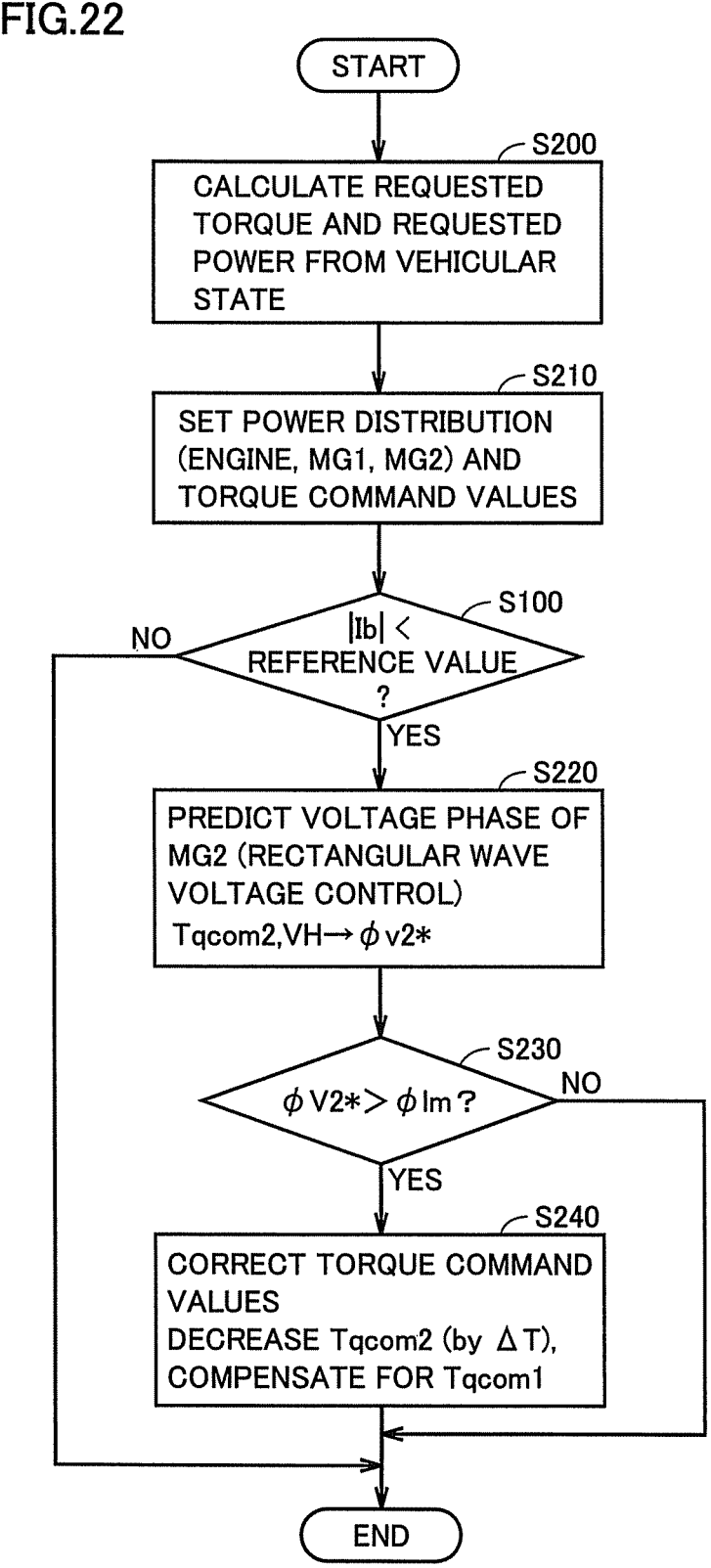
FIG. 22 is a flowchart illustrating a variation of control processing of phase limit correction control in the control system for an AC electric motor according to the third embodiment.

It is noted that, as shown in FIG. 22, also in the third embodiment, the control processing shown in FIG. 15 may be applied to execute correction of the power distribution for restricting the voltage phase only in the situation where there is a factor for causing system voltage VH to fluctuate (e.g., when is smaller than the reference value). In this case, step S100 similar to FIG. 15 should only be added to the flowchart of FIG. 21. Then, the opportunity to correct original torque command values Tqcom1 and Tqcom2 set in consideration of efficiency is limited to the situation where there is a factor for causing system voltage VH to fluctuate, and thus can be minimized. As a result, the decrease in fuel efficiency of the electric-powered vehicle due to reduction in loss in the control system for MG1 and MG2 can be minimized.

It is noted that the application of the control system for an AC electric motor according to the present embodiment is not limited to the illustrated control of a traction motor of an electric-powered vehicle. The control system for an AC electric motor according to the present embodiment can be applied to control of any AC electric motor provided that it is configured such that an AC electric motor is controlled by an inverter for which DC link voltage (system voltage VH) is variably controlled by a converter along with selection between the rectangular wave voltage control and the PWM control.

Moreover, the application of the control system for an AC electric motor according to the third embodiment is not limited to the hybrid vehicle shown in FIG. 18. The control system for an AC electric motor according to the third embodiment can be applied to any electric-powered vehicle that is configured such that a plurality of AC electric motors including a traction motor are controlled by a plurality of inverters having a common DC link voltage (system voltage VH), respectively, without limiting the structure of a powertrain.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control system for an AC electric motor, comprising:
 a boost converter configured to execute bidirectional DC electric power conversion between a power storage device and an electric power line such that a DC voltage on said electric power line is controlled in accordance with a voltage command value;
 an inverter configured to convert the DC voltage on said electric power line into an AC voltage to be applied to the AC electric motor;
 a pulse width modulation control unit configured to control said AC voltage output from said inverter to said AC electric motor by pulse width modulation control based on a comparison between a sinusoidal voltage command signal for operating said AC electric motor in accordance with a torque command value and a carrier signal; and
 a rectangular-wave voltage control unit configured to control said AC voltage output from said inverter to said AC electric motor such that a rectangular wave voltage is applied from said inverter to said AC electric motor when a modulation degree of said AC voltage by said pulse width modulation control on said DC voltage exceeds a predetermined reference value,
 said rectangular-wave voltage control unit controlling said inverter in accordance with said torque command value such that an absolute value of a voltage phase of said rectangular wave voltage is increased when the absolute value of torque of said AC electric motor is increased,
 said control system further comprising a phase restriction control unit configured to operate said AC electric motor such that rectangular wave voltage control is avoided from being performed in a state where the absolute value of said voltage phase falls within a region exceeding a limit phase set in accordance with said DC voltage and a rotational speed of said AC electric motor.

2. The control system for an AC electric motor according to claim 1, wherein, during said pulse width modulation control, said phase restriction control unit is configured to increase said voltage command value in accordance with an operating state of said AC electric motor such that said modulation degree does not exceed said reference value.

3. The control system for an AC electric motor according to claim 2, wherein
 when an operating point indicated by the rotational speed and torque of said AC electric motor falls within a predetermined region set for each said DC voltage during said pulse width modulation control, said phase restriction control unit is configured to increase said voltage command value such that said modulation degree falls below said reference value, and
 said predetermined region is set previously in correspondence to a region in which the absolute value of said voltage phase exceeds said limit phase when said rectangular wave voltage control is executed at the DC voltage and the operating point.

4. The control system for an AC electric motor according to claim 2, wherein, when the absolute value of a voltage phase indicated by a d-axis voltage and a q-axis voltage exceeds said limit phase during said pulse width modulation control, said phase restriction control unit increases said voltage command value such that said modulation degree falls below said reference value.

5. The control system for an AC electric motor according to claim 1, wherein, when the absolute value of said voltage phase during said rectangular wave voltage control exceeds said limit phase, said phase restriction control unit increases said voltage command value such that the absolute value of said voltage phase falls below said limit phase.

6. The control system for an AC electric motor according to claim 1, wherein
 a plurality of said AC electric motors mounted on an electric-powered vehicle are electrically connected in common to said electric power line via a plurality of said inverters, respectively,
 the plurality of said AC electric motors include a first electric motor as an electric motor for driving said electric-powered vehicle,
 said control system further comprising a torque command value setting unit configured to set a torque command value for each of the plurality of said AC electric motors in accordance with an operating state of said electric-powered vehicle,
 said phase restriction control unit decreases said torque command value for said first electric motor when the absolute value of said voltage phase obtained by said rectangular wave voltage control at said DC voltage at present exceeds said limit phase, said control system further comprising a torque command value correction unit configured to, when said torque command value for said first electric motor is decreased by said phase restriction control unit, correct said torque command value for electric motors other than said first electric motor so as to compensate for a reduction in vehicle driving force caused by the decrease.

7. The control system for an AC electric motor according to claim 1, wherein, only when the absolute value of an input/output current of said power storage device is smaller than a reference value, said phase restriction control unit executes control for avoiding said rectangular wave voltage control from being performed in a state where the absolute value of said voltage phase exceeds a limit phase set for each said DC voltage.

8. The control system for an AC electric motor according to claim 1, wherein said limit phase is determined based on a magnitude of a torque fluctuation relative to a fluctuation in said DC voltage in each voltage phase at each said DC voltage and each said rotational speed.

* * * * *